United States Patent
Chen et al.

(10) Patent No.: US 10,404,423 B2
(45) Date of Patent: Sep. 3, 2019

(54) TECHNIQUES FOR COMMUNICATING IN AN EXPANDED UPLINK PILOT TIME SLOT

(71) Applicant: QUALCOMM Incorporated, San Diego, CA (US)

(72) Inventors: Wanshi Chen, San Diego, CA (US); Peter Gaal, San Diego, CA (US); Hao Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 122 days.

(21) Appl. No.: 15/405,081

(22) Filed: Jan. 12, 2017

(65) Prior Publication Data

US 2017/0272214 A1 Sep. 21, 2017

Related U.S. Application Data

(60) Provisional application No. 62/310,634, filed on Mar. 18, 2016.

(51) Int. Cl.
*H04L 5/00* (2006.01)
*H04W 72/04* (2009.01)
*H04L 5/14* (2006.01)

(52) U.S. Cl.
CPC .......... *H04L 5/0001* (2013.01); *H04L 5/0044* (2013.01); *H04L 5/0051* (2013.01); *H04L 5/1469* (2013.01); *H04W 72/0413* (2013.01)

(58) Field of Classification Search
None
See application file for complete search history.

(56) References Cited

U.S. PATENT DOCUMENTS

| | | | | |
|---|---|---|---|---|
| 2011/0103272 A1* | 5/2011 | Dai | ................... | H04W 72/14 370/280 |
| 2011/0275335 A1* | 11/2011 | Luo | ................... | H04W 52/281 455/127.1 |
| 2013/0016705 A1* | 1/2013 | Zhang | ................... | H04L 5/0048 370/336 |
| 2014/0328260 A1* | 11/2014 | Papasakellariou | ................... | H04W 72/1289 370/329 |
| 2015/0078222 A1* | 3/2015 | Yang | ................... | H04B 7/2656 370/280 |
| 2015/0085723 A1* | 3/2015 | Chen | ................... | H04W 72/042 370/280 |
| 2015/0156762 A1* | 6/2015 | Hwang | ................... | H04L 1/1671 370/311 |

(Continued)

OTHER PUBLICATIONS

CMCC, "Motivation for New Work item Proposal: UL Transmission Enhancement for LTE," 3GPP TSG RAN Meeting #71, RP-160226, Gothenburg, Sweden, Mar. 7-10, 2016, 8 pgs., XP051076001, 3rd Generation Partnership Project.

(Continued)

*Primary Examiner* — Alex Skripnikov
(74) *Attorney, Agent, or Firm* — Holland & Hart LLP

(57) ABSTRACT

Techniques for wireless communication are described. One method includes identifying a data structure associated with an uplink pilot time slot (UpPTS) and a demodulation reference signal structure associated with the UpPTS, where the UpPTS occurs during a portion of a subframe, and communicating with a second device based at least in part on the data structure and the demodulation reference signal structure.

90 Claims, 20 Drawing Sheets

(56) References Cited

U.S. PATENT DOCUMENTS

2016/0338049 A1* 11/2016 Takeda .................. H04L 5/001

OTHER PUBLICATIONS

ISA/EP, International Search Report and Written Opinion of the International Searching Authority, Int'l Application No. PCT/US2017/016507, dated Apr. 19, 2017, European Patent Office, Rijswijk, NL, 14 pgs.
LG Electronics, "Other Design Aspects for TDD eiMTA," 3GPP TSG RAN WG1 Meeting #75, R1-135456, San Francisco, USA, Nov. 11-15, 2013, 5 pgs., XP050735129, 3rd Generation Partnership Project.
Samsung, "Discussions on Power Control for SRS Capacity Enhancement," 3GPP TSG RAN WG1 Meeting #82b, R1-155486, Malmo, Sweden, Oct. 5-9, 2015, 2 pgs., XP051002389, 3rd Generation Partnership Project.

* cited by examiner

| TDD DL-UL Subframe Configuration | DL-UL Switch-Point Periodicity | Subframe Number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

FIG. 2

TECHNIQUES FOR COMMUNICATING IN AN EXPANDED UPLINK PILOT TIME SLOT

CROSS REFERENCES

The present application for Patent claims priority to U.S. Provisional Patent Application No. 62/310,634 by CHEN, et al., entitled "TECHNIQUES FOR COMMUNICATING IN AN EXPANDED UPLINK PILOT TIME SLOT," filed Mar. 18, 2016, assigned to the assignee hereof, and which is hereby expressly incorporated by reference herein in its entirety.

BACKGROUND

Field of the Disclosure

The present disclosure, for example, relates to wireless communication systems, and more particularly to communicating in an expanded uplink pilot time slot (UpPTS).

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of network access devices (e.g., base stations), each simultaneously supporting communication for multiple communication devices, otherwise known as user equipment (UEs). A base station may communicate with UEs on downlink channels (e.g., downlinks, for transmissions from a base station to a UE) and uplink channels (e.g., uplinks, for transmissions from a UE to a base station).

Some wireless communication systems may provide an UpPTS during a portion of a subframe. A UE may transmit pilot signals (or reference signals) to a base station during an UpPTS.

SUMMARY

In some Long Term Evolution (LTE) and LTE-Advanced (LTE-A) networks, a two symbol period UpPTS may be provided in some subframes of some configurations of a time domain duplexing (TDD) radio frame structure. The two symbol period UpPTS may be used by UEs to transmit pilot signals (or reference signals) to a base station. The two symbol period UpPTS may, additionally or alternatively, be used by UEs performing random access procedures. In some LTE/LTE-A networks, an UpPTS may be provided in some subframes of some configurations of a TDD radio frame structure. The present disclosure describes techniques for using the UpPTS to transmit uplink transmissions such as a physical uplink shared channel (PUSCH) or a physical uplink control channel (PUCCH).

A method for wireless communication is described. The method may include identifying, by a first device, a data structure associated with an UpPTS and a demodulation reference signal structure associated with UpPTS. The UpPTS may occur during a portion of a subframe. The method may, additionally or alternatively, include communicating with a second device based at least in part on the data structure and the demodulation reference signal structure.

An apparatus for wireless communication is described. The apparatus may include means for identifying, by a first device, a data structure associated with an UpPTS and a demodulation reference signal structure associated with the UpPTS. The UpPTS may occur during a portion of a subframe. The apparatus may, additionally or alternatively, include means for communicating with a second device based at least in part on the data structure and the demodulation reference signal structure.

Another apparatus for wireless communication is described. The apparatus may include a processor, memory in electronic communication with the processor, and instructions stored in the memory. The instructions may be executable by the processor to identify, by a first device, a data structure associated with an UpPTS and a demodulation reference signal structure associated with the UpPTS. The UpPTS may occur during a portion of a subframe. The instructions may additionally be executable by the processor to communicate with a second device based at least in part on the data structure and the demodulation reference signal structure.

A non-transitory computer-readable medium storing computer-executable code for wireless communication is described. The code may be executable by a processor to identify, by a first device, a data structure associated with an symbol period UpPTS and a demodulation reference signal structure associated with the UpPTS. The UpPTS may occur during a portion of a subframe. The code may additionally be executable by the processor to communicate with a second device based at least in part on the data structure and the demodulation reference signal structure.

Some examples of the method, apparatus, and non-transitory computer-readable medium described above identifying the data structure and the demodulation reference signal structure associated with the UpPTS, may further include processes, features, means, or instructions for identifying a data structure and a demodulation reference signal structure of a PUSCH scheduled for transmission in the UpPTS.

Some examples of the method, apparatus, and non-transitory computer-readable medium described above, identifying the data structure and the demodulation reference signal structure of the PUSCH, may further include processes, features, means, or instructions for mapping a subset of modulation symbols of a nominal PUSCH configuration for a slot of the subframe to the UpPTS. In some examples of the method, apparatus, and non-transitory computer-readable medium described above, the subset of modulation symbols may include one of: a temporally last subset of modulation symbols of the nominal PUSCH configuration for the slot, or a temporally first subset of modulation symbols of the nominal PUSCH configuration for the slot.

Some examples of the method, apparatus, and non-transitory computer-readable medium described above, identifying the data structure and the demodulation reference signal structure associated with the UpPTS, may further include processes, features, means, or instructions for identifying that the UpPTS includes a six symbol period UpPTS, and identifying a demodulation reference signal transmission mapped to one of: a temporally third symbol period of the six symbol period UpPTS, or a temporally fourth symbol period of the six symbol period UpPTS, or a temporally second symbol period and a temporally fifth symbol period of the six symbol period UpPTS, or two symbol periods of the six symbol period UpPTS, or at least a temporally first symbol period of the six symbol period UpPTS.

Some examples of the method, apparatus, and non-transitory computer-readable medium described above may further include processes, features, means, or instructions for receiving an indication of the data structure and the demodulation reference signal structure of the PUSCH from a network access device, and the data structure and the demodulation reference signal structure of the PUSCH scheduled for transmission in the UpPTS may be identified based at least in part on the received indication of the data structure and the demodulation reference signal structure of the PUSCH. In some examples of the method, apparatus, and non-transitory computer-readable medium described above, the indication of the data structure and the demodulation reference signal structure of the PUSCH may include at least one of: a radio resource control (RRC) configuration, or a dynamic indication in downlink control information (DCI), or a DCI format, or a combination thereof.

Some examples of the method, apparatus, and non-transitory computer-readable medium described above may further include processes, features, means, or instructions for providing an indication of the identified data structure and the demodulation reference signal structure of the PUSCH to a UE.

In some examples of the method, apparatus, and non-transitory computer-readable medium described above, the UpPTS may occur prior to an uplink subframe. Some examples of the method, apparatus, and non-transitory computer-readable medium described above, identifying the data structure and the demodulation reference signal structure of the PUSCH, may further include processes, features, means, or instructions for identifying a PUSCH transport block configured for a transmission time interval (TTI) having a first duration equal to or less than a second duration of the UpPTS. Some examples of the method, apparatus, and non-transitory computer-readable medium described above, identifying the data structure and the demodulation reference signal structure of the PUSCH, may further include processes, features, means, or instructions for identifying a PUSCH transport block configured for a TTI spanning at least a portion of the UpPTS and at least a portion of the uplink subframe following the UpPTS.

Some examples of the method, apparatus, and non-transitory computer-readable medium described above may further include processes, features, means, or instructions for scheduling the PUSCH in an earlier-transmitted subframe, where the earlier-transmitted subframe may be transmitted prior to the subframe including the UpPTS.

Some examples of the method, apparatus, and non-transitory computer-readable medium described above may further include processes, features, means, or instructions for scheduling the PUSCH in the earlier-transmitted subframe may include transmitting, in the earlier-transmitted subframe, an uplink grant for the PUSCH. Some examples of the method, apparatus, and non-transitory computer-readable medium described above scheduling the PUSCH in the earlier-transmitted subframe may further include processes, features, means, or instructions for transmitting, in the earlier-transmitted subframe, an uplink grant for the PUSCH. In some examples of the method, apparatus, and non-transitory computer-readable medium described above, the uplink grant for the PUSCH may be an only uplink grant transmitted in the earlier-transmitted subframe.

Some examples of the method, apparatus, and non-transitory computer-readable medium described above may further include processes, features, means, or instructions for transmitting, in the earlier-transmitted subframe, at least one additional uplink grant for at least one additional PUSCH scheduled in at least one additional subframe.

Some examples of the method, apparatus, and non-transitory computer-readable medium described above may further include processes, features, means, or instructions for allocating: a separate physical hybrid automatic repeat request indicator channel (PHICH) resource or a shared PHICH resource for the PUSCH, where the shared PHICH resource may be shared with the at least one additional PUSCH. In some examples of the method, apparatus, and non-transitory computer-readable medium described above, the uplink grant for the PUSCH may schedule at least one additional PUSCH scheduled in at least one additional subframe. In some examples of the method, apparatus, and non-transitory computer-readable medium described above, the uplink grant may be transmitted in a physical downlink control channel (PDCCH) or an enhanced PDCCH (EPDCCH).

Some examples of the method, apparatus, and non-transitory computer-readable medium described above may further include processes, features, means, or instructions for allocating a separate PHICH resource for the PUSCH. Some examples of the method, apparatus, and non-transitory computer-readable medium described above may further include processes, features, means, or instructions for configuring a separate hybrid automatic repeat request (HARQ) process for the PUSCH. Some examples of the method, apparatus, and non-transitory computer-readable medium described above may further include processes, features, means, or instructions for scheduling a re-transmission of the PUSCH using at least one of: a PDCCH, or an enhanced PDCCH (EPDCCH), or an asynchronous uplink HARQ operation. Some examples of the method, apparatus, and non-transitory computer-readable medium described above may further include processes, features, means, or instructions for allocating a same DCI size scheduling for the PUSCH scheduled for transmission in the UpPTS and at least one additional PUSCH scheduled for transmission in an uplink subframe. Some examples of the method, apparatus, and non-transitory computer-readable medium described above may further include processes, features, means, or instructions for allocating resources of the PUSCH based at least in part on a multiple resource block granularity.

Some examples of the method, apparatus, and non-transitory computer-readable medium described above may further include processes, features, means, or instructions for receiving a scheduling of the PUSCH in an earlier-transmitted subframe, the earlier-transmitted subframe received prior to the subframe including the UpPTS.

Some examples of the method, apparatus, and non-transitory computer-readable medium described above, receiving the scheduling of the PUSCH in the earlier-transmitted subframe, may further include processes, features, means, or instructions for receiving, in the earlier-transmitted subframe, an uplink grant for the PUSCH. In some examples of the method, apparatus, and non-transitory computer-readable medium described above, the uplink grant for the PUSCH may be an only uplink grant received in the earlier-transmitted subframe. Some examples of the method, apparatus, and non-transitory computer-readable medium described above may further include processes, features, means, or instructions for receiving, in the earlier-transmitted subframe, at least one additional uplink grant for at least one additional PUSCH scheduled in at least one additional subframe. Some examples of the method, apparatus, and non-transitory computer-readable medium described above may further include processes, features, means, or instructions for identifying: a separate PHICH resource or a shared PHICH resource for the PUSCH, where the shared PHICH resource may be shared with the at least one additional PUSCH.

In some examples of the method, apparatus, and non-transitory computer-readable medium described above, the uplink grant for the PUSCH may schedule at least one additional PUSCH scheduled in at least one additional subframe. In some examples of the method, apparatus, and non-transitory computer-readable medium described above, the uplink grant may be received in a PDCCH. Some examples of the method, apparatus, and non-transitory computer-readable medium described above may further include processes, features, means, or instructions for identifying a separate PHICH resource for the PUSCH. Some examples of the method, apparatus, and non-transitory computer-readable medium described above may further include processes, features, means, or instructions for receiving a configuration of a separate HARQ process for the PUSCH. Some examples of the method, apparatus, and non-transitory computer-readable medium described above may further include processes, features, means, or instructions for receiving a scheduling of a re-transmission of the PUSCH in at least one of: a PDCCH, or an EPDCCH, or an asynchronous uplink HARQ operation. Some examples of the method, apparatus, and non-transitory computer-readable medium described above may further include processes, features, means, or instructions for identifying a same DCI size scheduling for the PUSCH scheduled for transmission in the UpPTS and at least one additional PUSCH scheduled for an uplink subframe. Some examples of the method, apparatus, and non-transitory computer-readable medium described above may further include processes, features, means, or instructions for receiving an allocation of resources of the PUSCH based at least in part on a multiple resource block granularity.

Some examples of the method, apparatus, and non-transitory computer-readable medium described above may further include processes, features, means, or instructions for identifying a timing of a sounding reference signal (SRS) transmitted during the UpPTS. Some examples of the method, apparatus, and non-transitory computer-readable medium described above may further include processes, features, means, or instructions for identifying a timing of a PUCCH transmitted during the UpPTS, and identifying at least one of: channel state information (CSI), a scheduling request (SR), or a combination thereof transmitted in the PUCCH. Some examples of the method, apparatus, and non-transitory computer-readable medium described above may further include processes, features, means, or instructions for determining to refrain from transmitting HARQ information during the PUCCH. Some examples of the method, apparatus, and non-transitory computer-readable medium described above may further include processes, features, means, or instructions for identifying a timing of physical random access channel (PRACH) resources in more than two symbol periods of the UpPTS. Some examples of the method, apparatus, and non-transitory computer-readable medium described above may further include processes, features, means, or instructions for identifying a bundling of at least a first resource of the PUSCH scheduled for transmission in the UpPTS with at least a second resource of at least one additional PUSCH scheduled for at least one additional subframe. In some examples of the method, apparatus, and non-transitory computer-readable medium described above, the first resource may have a first resource granularity that differs from a second resource granularity of the second resource.

In some examples of the method, apparatus, and non-transitory computer-readable medium described above, the UpPTS may occur prior to an uplink subframe. Some examples of the method, apparatus, and non-transitory computer-readable medium described above may further include processes, features, means, or instructions for identifying a restriction on a transmission, during the UpPTS, of at least one of: aperiodic channel quality information (CQI), or an aperiodic SRS, or a combination thereof. The restriction may be based at least in part on a transmission during the uplink subframe. Some examples of the method, apparatus, and non-transitory computer-readable medium described above may further include processes, features, means, or instructions for scaling a transmit power of the subframe: at a subframe-level, or at a slot-level.

In some examples of the apparatus, the means for identifying the data structure and the demodulation reference signal structure associated with the UpPTS may include means for identifying a data structure and a demodulation reference signal structure of a PUSCH scheduled for transmission in the UpPTS.

The foregoing has outlined rather broadly the techniques and technical advantages of examples according to the disclosure in order that the detailed description that follows may be better understood. Additional techniques and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or functions may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 2 shows a set of TDD radio frame structures that may be supported by the wireless communication devices (e.g., base stations and UEs) of a wireless communication system, in accordance with various aspects of the present disclosure;

DETAILED DESCRIPTION

Techniques are described in which an expanded UpPTS may be used by UEs to transmit uplink transmissions such as a PUSCH or PUCCH transmissions (as well as other uplink transmissions or signals).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
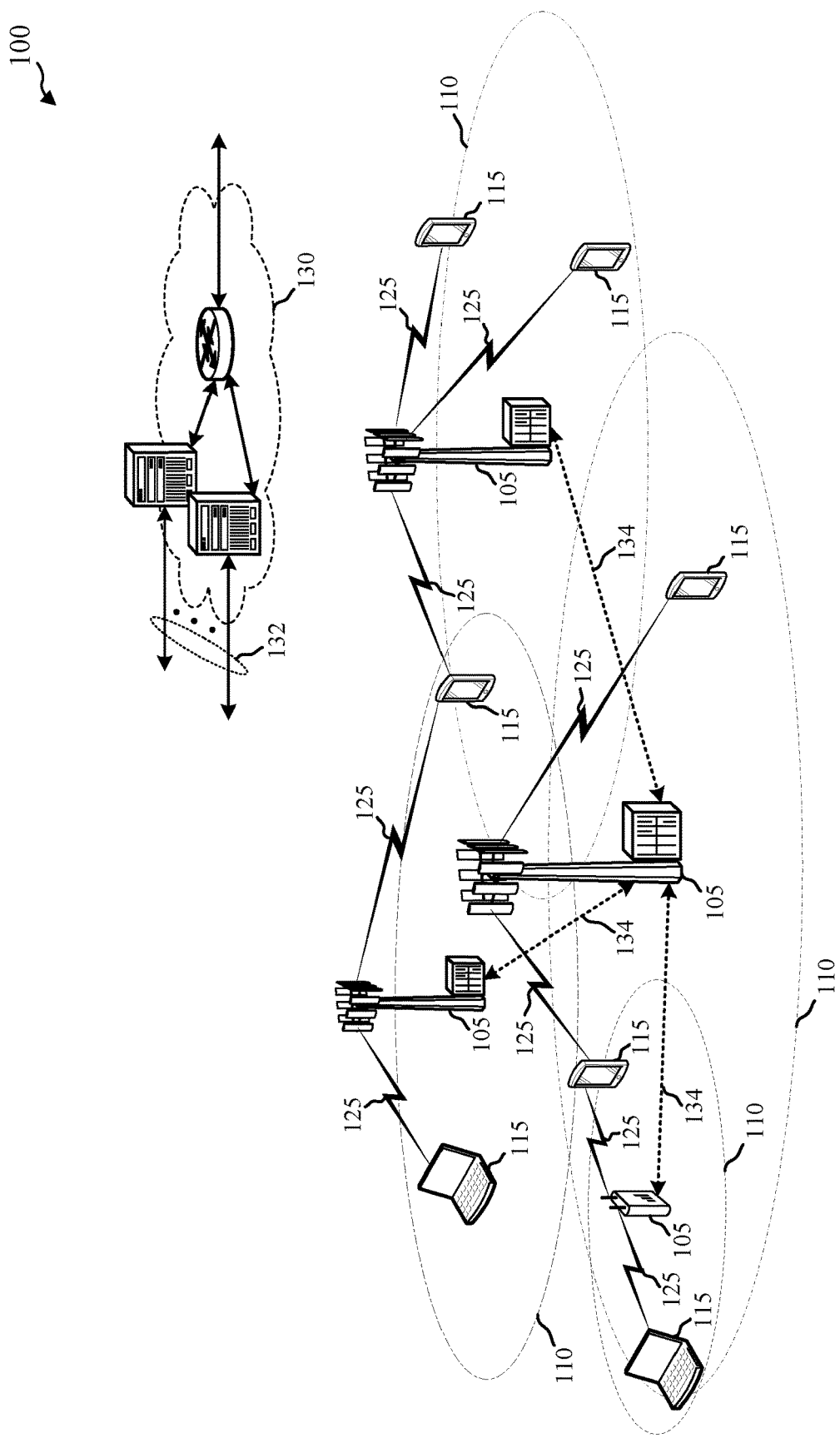
FIG. 1 illustrates an example of a wireless communication system, in accordance with various aspects of the present disclosure.

FIG. 1 illustrates an example of a wireless communication system 100, in accordance with various aspects of the present disclosure. The wireless communication system 100 may include network access devices (e.g., base stations 105), UEs 115, and a core network 130. The core network 130 may provide user authentication, access authorization, tracking, Internet Protocol (IP) connectivity, and other access, routing, or mobility functions. The base stations 105 may interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, a base station 105 may be referred to as a base transceiver station, a radio base station, an access point, a radio transceiver, a NodeB, an eNodeB (eNB), a Home NodeB, a Home eNodeB, or some other suitable terminology. The geographic coverage area 110 for a base station 105 may be divided into sectors making up a portion of the coverage area (not shown). The wireless communication system 100 may include base stations 105 of different types (e.g., macro or small cell base stations). There may be overlapping geographic coverage areas 110 for different technologies.

In some examples, the wireless communication system 100 may include an LTE/LTE-A network. In LTE/LTE-A networks, the term evolved Node B (eNB) may be used to describe the base stations 105, while the term UE may be used to describe the UEs 115. The wireless communication system 100 may be a Heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs with service subscriptions with the network provider. A small cell may be a lower-powered base station, as compared with a macro cell that may operate in the same or different (e.g., licensed, shared, etc.) radio frequency spectrum bands as macro cells. Small cells may include pico cells, femto cells, and micro cells according to various examples. A pico cell may cover a relatively smaller geographic area and may allow unrestricted access by UEs with service subscriptions with the network provider. A femto cell additionally may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may additionally use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to Physical channels.

The UEs 115 may be dispersed throughout the wireless communication system 100, and each UE 115 may be stationary or mobile. A UE 115 may additionally include or be referred to by those skilled in the art as a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment, including macro eNBs, small cell eNBs, relay base stations, and the like.

The communication links 125 shown in wireless communication system 100 may include downlinks (DLs), from a base station 105 to a UE 115, or uplinks (ULs), from a UE 115 to a base station 105. The downlinks may also be called forward links, while the uplinks may also be called reverse links.

In some examples, each communication link 125 may include one or more carriers, where each carrier may be a signal made up of multiple sub-carriers (e.g., waveform signals of different frequencies) modulated according to the various radio technologies described above. Each modulated signal may be transmitted on a different sub-carrier and may carry control information (e.g., reference signals, control channels, etc.), overhead information, user data, etc. The communication links 125 may transmit bidirectional communications using a frequency domain duplexing (FDD) operation (e.g., using paired spectrum resources) or a TDD operation (e.g., using unpaired spectrum resources). Frame structures for FDD operation (e.g., frame structure type 1) and TDD operation (e.g., frame structure type 2) may be defined.

In some examples of the wireless communication system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple-input, multiple-output (MIMO) techniques that may take advantage of multi-path environments to transmit multiple spatial layers carrying the same or different coded data.

The wireless communication system 100 may support operation on multiple cells or carriers, a feature which may be referred to as carrier aggregation (CA) or dual-connectivity operation. A carrier may also be referred to as a component carrier (CC), a layer, a channel, etc. The terms "carrier," "component carrier," "cell," and "channel" may be used interchangeably herein. Carrier aggregation may be used with both FDD and TDD component carriers.

In an LTE/LTE-A network, a UE 115 may be configured to communicate using up to five CCs when operating in a carrier aggregation mode or dual-connectivity mode. One or more of the CCs may be configured as a DL CC, and one or more of the CCs may be configured as a UL CC. Also, one of the CCs allocated to a UE 115 may be configured as a primary CC (PCC), and the remaining CCs allocated to the UE 115 may be configured as secondary CCs (SCCs).

FIG. 2 shows a set of TDD radio frame structures 200 that may be supported by the wireless communication devices (e.g., base stations and UEs) of a wireless communication system, in accordance with various aspects of the present disclosure. In some examples, the wireless communication system may be an example of aspects of the wireless communication system described with reference to FIG. 1.

In some examples, the TDD radio frame structures may include sets of subframes (e.g., ten subframes, numbered 0-9) configured in accordance with different TDD DL-UL subframe configurations (e.g., 7 different TDD DL-UL subframe configurations, numbered 0-6). In some examples, the TDD DL-UL subframe configurations may include subsets of DL-UL subframe configurations associated with different switch-point periodicities. For example, a first subset of DL-UL subframe configurations may be associated with a 5 millisecond (ms) switch-point periodicity, and a second subset of DL-UL subframe configurations may be associated with a 10 ms switch-point periodicity. Each DL-UL subframe configuration in the first subset of DL-UL subframe configurations may include a number of downlink (D) subframes, a number of uplink (U) subframes, and two special (S) subframes. Each DL-UL subframe configuration in the second subset of DL-UL subframe configurations may include a number of D subframes, a number of U subframes, and one S subframe. Each S subframe may provide a transition between a downlink burst (e.g., one or more D subframes) and an uplink burst (e.g., one or more U subframes).

Figure 3:
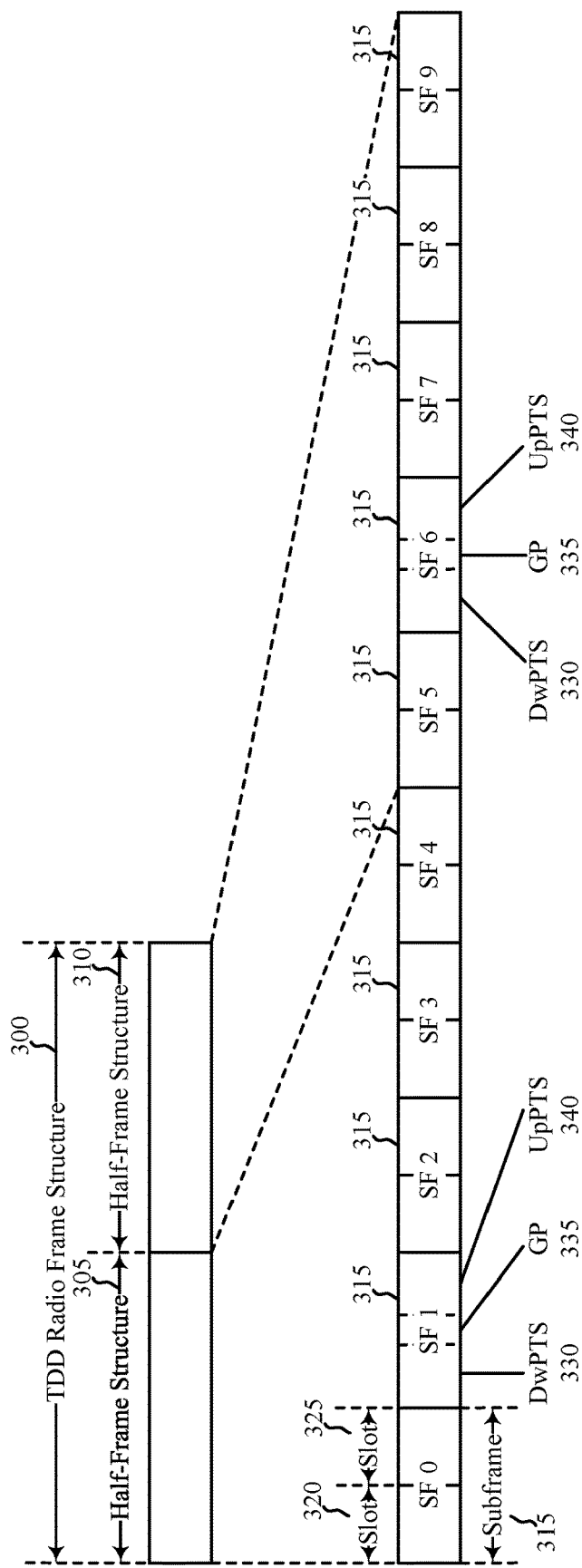
FIG. 3 shows a TDD radio frame structure having a DL-UL subframe configuration associated with a 5 ms switch-point periodicity, in accordance with various aspects of the present disclosure.

FIG. 3 shows a TDD radio frame structure 300 having a DL-UL subframe configuration associated with a 5 ms switch-point periodicity, in accordance with various aspects of the present disclosure. In some examples, the DL-UL subframe configuration may be an example of aspects of the DL-UL subframe configuration numbered 0, 1, 2, or 6 in FIG. 2.

In some examples, the TDD radio frame structure 300 may include a first half-frame structure 305 followed by a second half-frame structure 310. Each of the first half-frame structure 305 and the second half-frame structure 310 may have a duration equal to half the duration of the TDD radio frame structure 300. In some examples, each of the first half-frame structure 305 and the second half-frame structure 310 may have the same structure and may include a subset of five subframes 315 (e.g., subframes 315 numbered 0, 1, 2, 3, and 4, or subframes 315 numbered 5, 6, 7, 8, and 9).

In some examples, each of the subframes 315 configured as a downlink subframe or an uplink subframe (e.g., subframes (SFs) 315 numbered 0, 2, 3, 4, 5, 7, 8, and 9) may include a first slot 320 followed by a second slot 325. Each of the first slot 320 and the second slot 325 may have a slot duration equal to half the duration of a subframe. In some examples, each of the subframes 315 configured as a special subframe (e.g., subframes 315 numbered 2 and 6) may include a downlink pilot time slot (DwPTS) 330, a guard period (GP) 335, and an uplink pilot time slot (UpPTS) 340.

In some wireless communications systems, it may be possible to dynamically adapt the DL-UL subframe configuration used by the wireless communication system (or a subset of devices (e.g., base stations and UEs) of the wireless communication system) based on the DL-UL traffic needs or requirements of the wireless communication system. A wireless communication system employing evolved interference management for traffic adaptation (eIMTA) may perform such an adaptation. For example, if a large data burst on a downlink may be requested for a short duration, the TDD radio frame structure used for communication between a subset of wireless communication devices in a wireless communication system may be changed from the DL-UL subframe configuration numbered 1 in FIG. 2 (with a 6:4 DL:UL ratio) to the DL-UL subframe configuration numbered 5 in FIG. 2 (with a 9:1 DL:UL ratio). In some examples, the DL-UL subframe configuration employed for communication may be adapted no slower than 640 ms, and as fast as 10 ms.

The use of different DL-UL subframe configurations by different cells may in some cases result in inter-cell interference. For example, inter-cell interference may result from a first cell employing a first DL-UL subframe configuration including a D subframe in a subframe number n, and a second cell employing a second DL-UL subframe configuration including a U subframe in the subframe number n.

In some examples, a base station may provide a dynamic indication of the DL-UL subframe configuration employed. The dynamic indication may be provided by explicit layer signaling of a reconfiguration in a UE-group-common physical downlink control channel (PDCCH) or enhanced PDCCH (EPDCCH).

The adaptation of DL-UL subframe configurations based on traffic needs or requirements may increase the complexity of HARQ management. In some examples, HARQ management may be simplified by identifying one or more reference DL-UL subframe configurations for HARQ. For example, for UL HARQ, scheduling and HARQ timing may be based on a DL-UL subframe configuration indicated in a system information block (SIB) (e.g., a DL-UL subframe configuration indicated in a SIB1). For DL HARQ, scheduling and HARQ timing may be based on a reference DL-UL subframe configuration indicated for use by a UE (e.g., the DL-UL subframe configuration numbered 2, 4, or 5 in FIG. 2).

In wireless communication systems employing eIMTA, some subframes (e.g., some subframe numbers) may be subject to dynamic adaptation in transmission direction, while other subframes may not be subject to dynamic adaptation in transmission direction. For example, D subframes in a DL-UL subframe configuration indicated in a SIB1 may not be subject to dynamic adaptation in transmission direction, and U subframes in a DL-UL subframe configuration indicated for use by a UE for DL HARQ may not be subject to dynamic adaptation in transmission direction.

The UpPTS 340 described with reference to FIG. 3 may have different durations. In some examples, the UpPTS 340 may have a duration of one or two symbols (e.g., one or two orthogonal frequency-division multiplexing (OFDM) symbol periods or single-carrier frequency division multiplexing (SC-FDM) symbol periods). In these examples, the UpPTS 340 may be used to carry a shortened physical random access channel (PRACH) (e.g., a LTE/LTE-A PRACH format 4) and/or a sounding reference signal (SRS), but no physical uplink control channel (PUCCH) transmission or physical uplink shared channel (PUSCH) transmission. In other examples, the UpPTS 340 may have a longer duration. In these examples, the UpPTS 340 may provide more SRS transmission opportunities (e.g., for 3D-MIMO applications) or be used to carry a PUSCH transmission.

Figure 4:
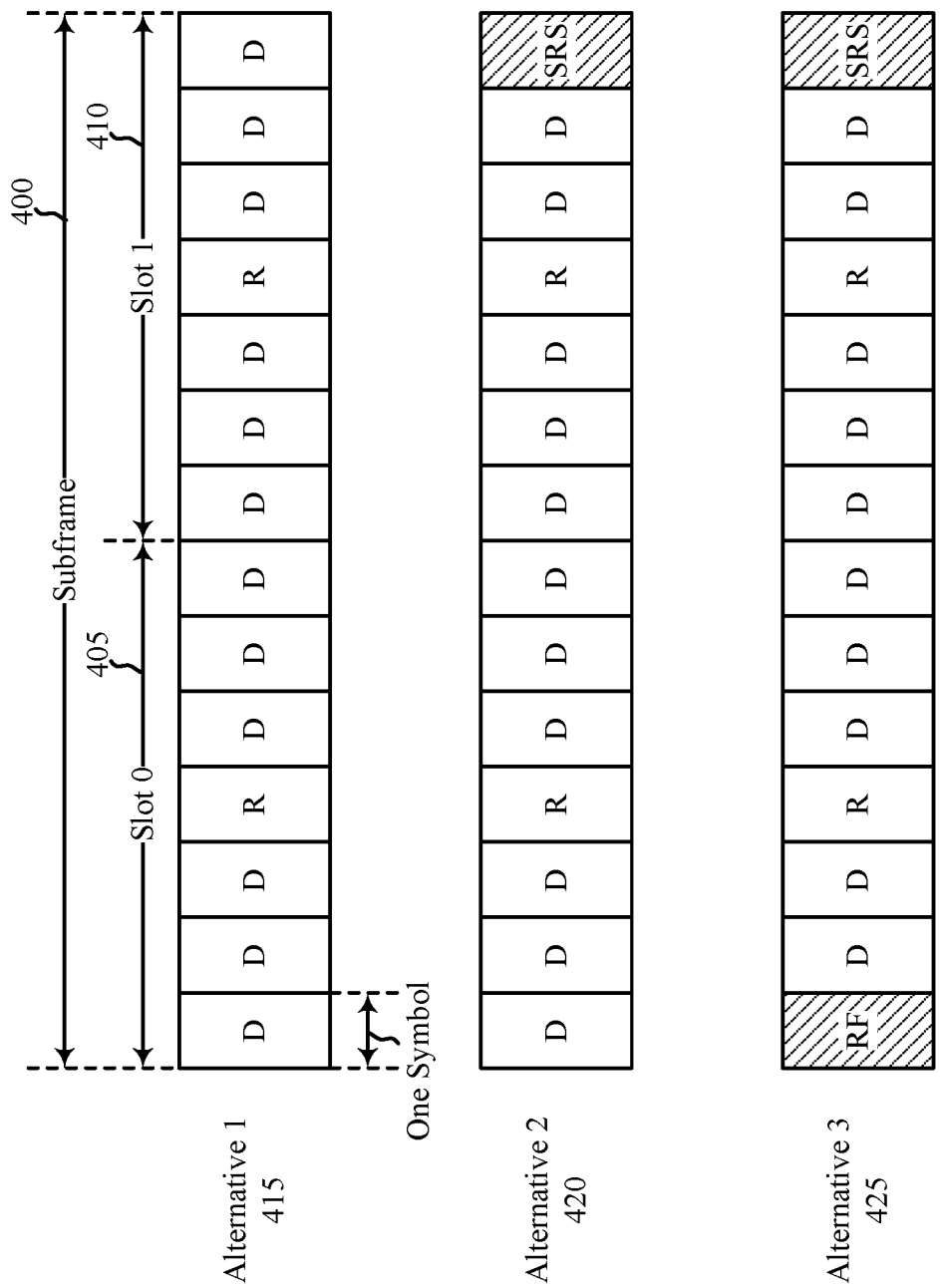
FIG. 4 shows alternative configurations of a subframe in which a PUSCH may be transmitted, in accordance with various aspects of the present disclosure.

FIG. 4 shows alternative configurations of a subframe 400 in which a PUSCH may be transmitted, in accordance with various aspects of the present disclosure. In some examples, the subframe 400 may be an example of aspects of one of the U subframes in one of the DL-UL subframe configurations described with reference to FIG. 2. The subframe 400 may include a first slot 405 (Slot 0) followed by a second slot 410 (Slot 1). In some examples, the subframe 400 may have a duration of 1 ms.

In a LTE/LTE-A network, a PUSCH may occupy both slots (e.g., the first slot 405 and the second slot 410) of the subframe 400. A PUSCH configuration for each slot may include seven symbols (e.g., a first three data (D) symbols, followed by a demodulation reference (R) symbol (DM-RS), followed by a second three data symbols) with normal cyclic prefixes (CPs), as shown in Alternative 1 415, or six symbols with extended CPs (not shown). In some examples, the PUSCH configuration may include a predetermined number of symbols for the extended CP, e.g., five symbols. However, in some examples, the PUSCH configuration for a slot may be adapted to account for other transmissions during the slot. For example, for non-machine type communication (non-MTC) UEs, and as shown in Alternative 2 420, the first slot 405 may include a full-length PUSCH transmission (e.g., a nominal PUSCH configuration including seven symbols with normal CPs (as shown), or a nominal PUSCH configuration including six symbols with extended CPs (not shown)), and the second slot 410 may include a shortened PUSCH transmission, with the last symbol of the second slot 410 intended to be occupied by a SRS transmission. By way of further example, for machine type communication (MTC) UEs, and as shown in Alternative 3 425, the first symbol of the first slot 405 may not be used (e.g., to facilitate radio frequency (RF) tuning from one narrowband to another narrowband for narrowband devices (e.g., narrow band Internet of Things (NB-IoT) devices), and the last symbol of the second slot 410 may not be used (e.g., because the last symbol of the second slot 410 may be occupied by a SRS transmission).

When a symbol of the first slot 405 or the second slot 410 may not be used for a PUSCH transmission, a modulation symbol of a nominal PUSCH configuration may be mapped onto the non-used symbol (e.g., a modulation symbol of a nominal PUSCH configuration may be punctured by another signal (e.g., a SRS) or gated off). Alternatively, a modulation symbol of a nominal PUSCH configuration may not be mapped onto the non-used symbol (e.g., a subset of modulation symbols of a nominal PUSCH configuration may be rate-matched around the non-used symbol).

Figure 5:
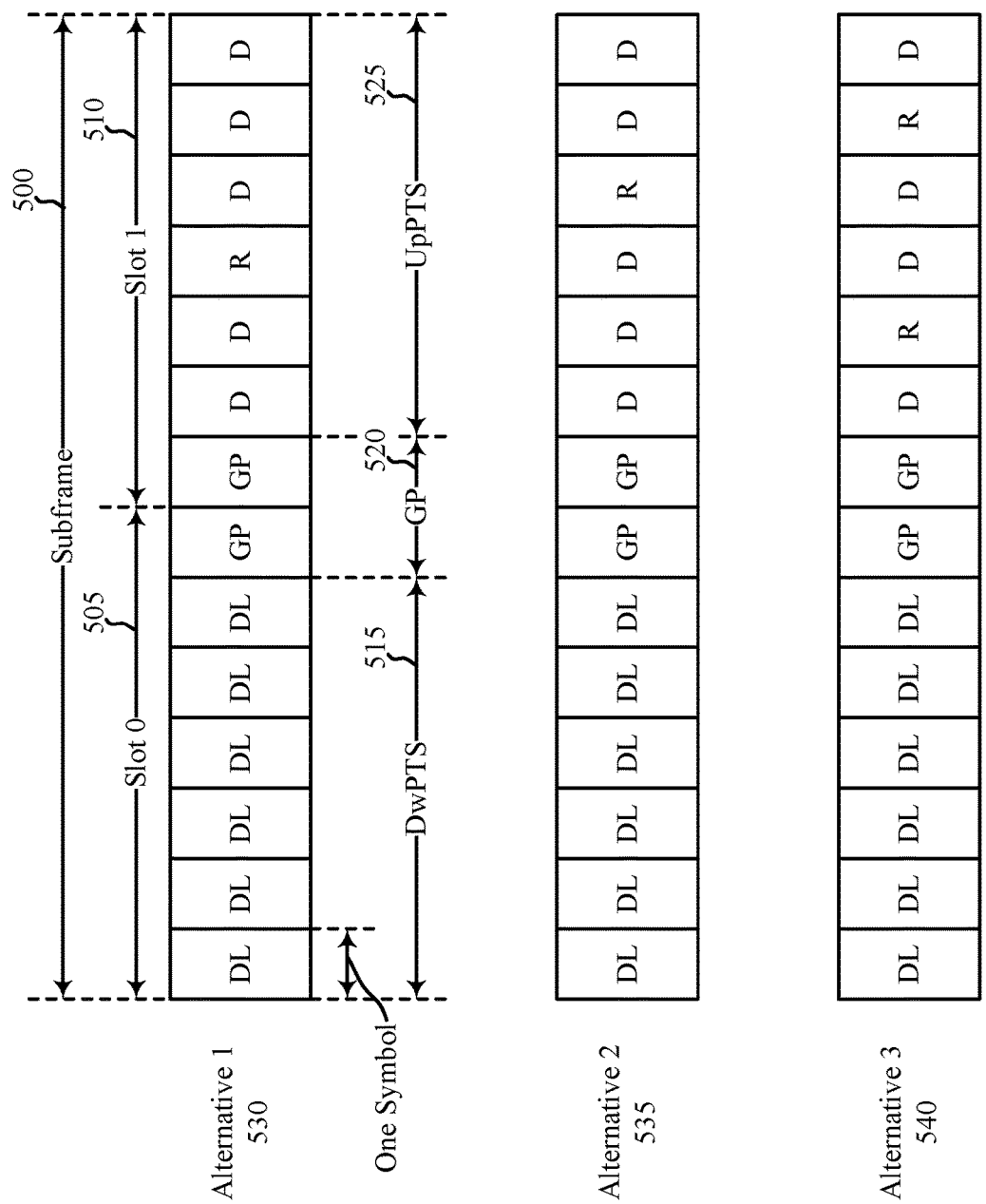
FIG. 5 shows alternative configurations of a subframe including a six symbol period UpPTS, in accordance with various aspects of the present disclosure.

FIG. 5 shows alternative configurations of a subframe 500 including a six symbol period UpPTS, in accordance with various aspects of the present disclosure. In some examples, the subframe 500 may be an example of aspects of one of the S subframes included in one of the DL-UL subframe configurations described with reference to FIG. 2. The subframe 500 may include a first slot 505 (Slot 0) followed by a second slot 510 (Slot 1). The subframe 500 may include a six symbol period DwPTS 515 within the first slot 505, followed by a two symbol GP 520 spanning the first slot 505 and the second slot 510, followed by a six symbol period UpPTS 525 within the second slot 510. A PUSCH may be transmitted during the six symbol period UpPTS 525. In some examples, the subframe 500 may have a duration of 1 ms.

In some examples, a subset of modulation symbols of a nominal PUSCH configuration for a slot (e.g., a subset of modulation symbols of the nominal PUSCH configuration for a slot described with reference to Alternative 1 415 of FIG. 4) may be mapped to the six symbol period UpPTS 525. In some examples, the subset of modulation symbols of the nominal PUSCH configuration for a slot may include a temporally last subset of modulation symbols of the nominal PUSCH configuration for the slot (e.g., the first D symbol of the seven symbol nominal PUSCH configuration for a slot described with reference to Alternative 1 415 of FIG. 4 may not be mapped to the six symbol period UpPTS 525, resulting in a DDRDDD symbol pattern being transmitted during the six symbol period UpPTS 525, as shown in Alternative 1 530), or a temporally first subset of modulation symbols of the nominal PUSCH configuration for the slot (e.g., the last D symbol of the seven symbol nominal PUSCH configuration for a slot described with reference to Alternative 1 415 of FIG. 4 may not be transmitted during the six symbol period UpPTS 525, resulting in a DDDRDD symbol pattern being transmitted during the six symbol period UpPTS 525, as shown in Alternative 2 535).

In some examples, a pattern of modulation symbols other than a subset of modulation symbols of a nominal PUSCH configuration for a slot may be mapped to the six symbol period UpPTS 525. For example, a demodulation reference signal transmission (R symbol) may be mapped to a temporally third symbol period of the six symbol period UpPTS 525, and PUSCH data symbols (D symbols) may be mapped to at least some of the other symbol periods of the six symbol period UpPTS 525, as shown in Alternative 1 530; or a demodulation reference signal transmission may be mapped to a temporally fourth symbol period of the six symbol period UpPTS 525, and PUSCH data symbols may be mapped to at least some of the other symbol periods of the six symbol period UpPTS 525, as shown in Alternative 2 535; or a demodulation reference signal transmission may be mapped to a temporally second symbol period and a temporally fifth symbol period of the six symbol period UpPTS 525, and PUSCH data symbols may be mapped to at least some of the other symbol periods of the six symbol period UpPTS 525, as shown in Alternative 3 540; or demodulation reference signals may be mapped to two symbol periods of the six symbol period UpPTS 525, and PUSCH data symbols may be mapped to at least some of the other symbol periods of the six symbol period UpPTS 525, as shown in Alternative 3 540; or a demodulation reference signal may be mapped to at least a temporally first symbol period of the six symbol period UpPTS 525, and PUSCH data symbols may be mapped to at least some of the other symbol periods of the six symbol period UpPTS 525 (not shown). Configurations in which demodulation reference signals are mapped to at least two symbol periods of the six symbol period UpPTS 525 may be useful in that other LTE/LTE-A PUSCH transmissions are transmitted over the two slots of a subframe, with one demodulation reference signal transmitted per slot. Also, the use of some orthogonal cover codes (OCCs) used in MIMO transmissions may require the transmission of a demodulation reference signal during each of two symbol periods.

In some examples, a PUSCH may be transmitted during the six symbol period UpPTS 525 using one of a plurality of alternative data structures and demodulation reference signal structures (e.g., one of the data structures and demodulation reference signal structures associated with Alternative 1 530, Alternative 2 535, or Alternative 3 540), and a network access device (e.g., a base station) may transmit an indication of the data structure and the demodulation reference signal structure that a UE should use. The indication of the data structure and the demodulation reference signal structure may include, for example, at least one of a RRC configuration, or a dynamic indication in downlink control information (DCI), or a DCI format, or a combination thereof. In some examples, the dynamic indication in DCI may be implicit. For example, when DCI indicates single input, multiple output (SIMO) operation, the use of Alternative 1 530 may be implicitly indicated, or when DCI indicates MIMO operation, the use of Alternative 3 540 may be implicitly indicated.

In some examples, a six symbol period UpPTS may occur prior to an uplink subframe (e.g., a U subframe in which all of the data transmitted may be uplink data). For example, each of the S subframes described with reference to FIG. 2 (e.g., the subframes numbered 1 and 6 in the DL-UL subframe configurations numbered 0, 1, 2, and 6, and the subframes numbered 1 in the DL-UL subframe configurations numbered 3, 4, and 5) ends with a six symbol period UpPTS and may be transmitted prior to a U subframe. In some examples, the data structure and the demodulation reference signal structure of a PUSCH scheduled during the six symbol period UpPTS may be associated with a PUSCH transport block configured for a transmission time interval (TTI) having a first duration equal to or less than a second duration of a single uplink subframe (e.g., a transport block or TTI within the UpPTS that may be shorter than a transport block or TTI corresponding to a single uplink subframe). In other examples, the data structure and the demodulation reference signal structure of a PUSCH scheduled during the six symbol period UpPTS may be associated with a PUSCH transport block configured for a TTI spanning at least a portion of the six symbol period UpPTS and at least a portion of the uplink subframe following the six symbol period UpPTS (e.g., a transport block or TTI bundling across both UpPTS and the following U subframe that may be longer than a transport block or TTI corresponding to a single uplink subframe). In either example, the transport block size for the shortened TTI or the lengthened TTI may be determined by scaling the transport block size used for a single uplink subframe. In some examples, a downscaling of the transport block size used for a single uplink subframe may be based on a scaling of the number of resource blocks (RBs) associated with the transport block size (e.g., a half of the number of RBs associated with the transport block size used for a single uplink subframe). The downscaled number of RBs may in some examples be obtained from a transport block size look-up table. In some examples, upscaling of the transport block size used for a single uplink subframe may be based on a scaling of the transport block size (e.g., one and a half of the transport block size used for a single uplink subframe). The upscaled number of RBs may be determined directly from the transport block size used for a single uplink subframe because the transport block size look-up table may not have entries corresponding for transport block sizes greater than the transport block size used for a single uplink subframe.

An uplink transmission (e.g., a PUSCH) scheduled for transmission in an uplink subframe of a DL-UL subframe configuration (e.g., a PUSCH scheduled for transmission in a U subframe of one of the DL-UL subframe configurations described with reference to FIG. 2) may have a fixed scheduling timing. When a PUSCH may or may not be scheduled for transmission in a six symbol period UpPTS of a S subframe, the scheduling timing of a DL-UL subframe configuration may vary based on whether a PUSCH may be transmitted in a six symbol period UpPTS of a S subframe included in a DL-UL subframe configuration.

An uplink transmission (e.g., a PUSCH) scheduled for transmission in a six symbol period UpPTS may be scheduled for transmission in a number of ways. A re-transmission of an uplink transmission scheduled for transmission in a six symbol period UpPTS may, additionally or alternatively, be scheduled for transmission in a number of ways. In some examples, a PUSCH in a six symbol period UpPTS may be scheduled for transmission in a same subframe used to schedule one or more downlink subframes or uplink subframes. In the DL-UL subframe configuration numbered 0 in FIG. 2, the DL:UL subframe ratio may be 4:6 without scheduling uplink transmissions in the S subframes (i.e., assuming that partial subframe downlink transmissions are made in the two S subframes). When uplink transmissions are made in the two S subframes, the DL:UL subframe ratio for the DL-UL subframe configuration numbered 0 in FIG. 2 effectively becomes 4:8. PHICH timing for uplink transmission opportunities (e.g., PUSCH transmission opportunities) in six symbol period UpPTSs of S subframes may, additionally or alternatively, vary based on whether a PUSCH is transmitted in a six symbol period UpPTS of a S subframe included in a DL-UL subframe configuration.

Figure 6:
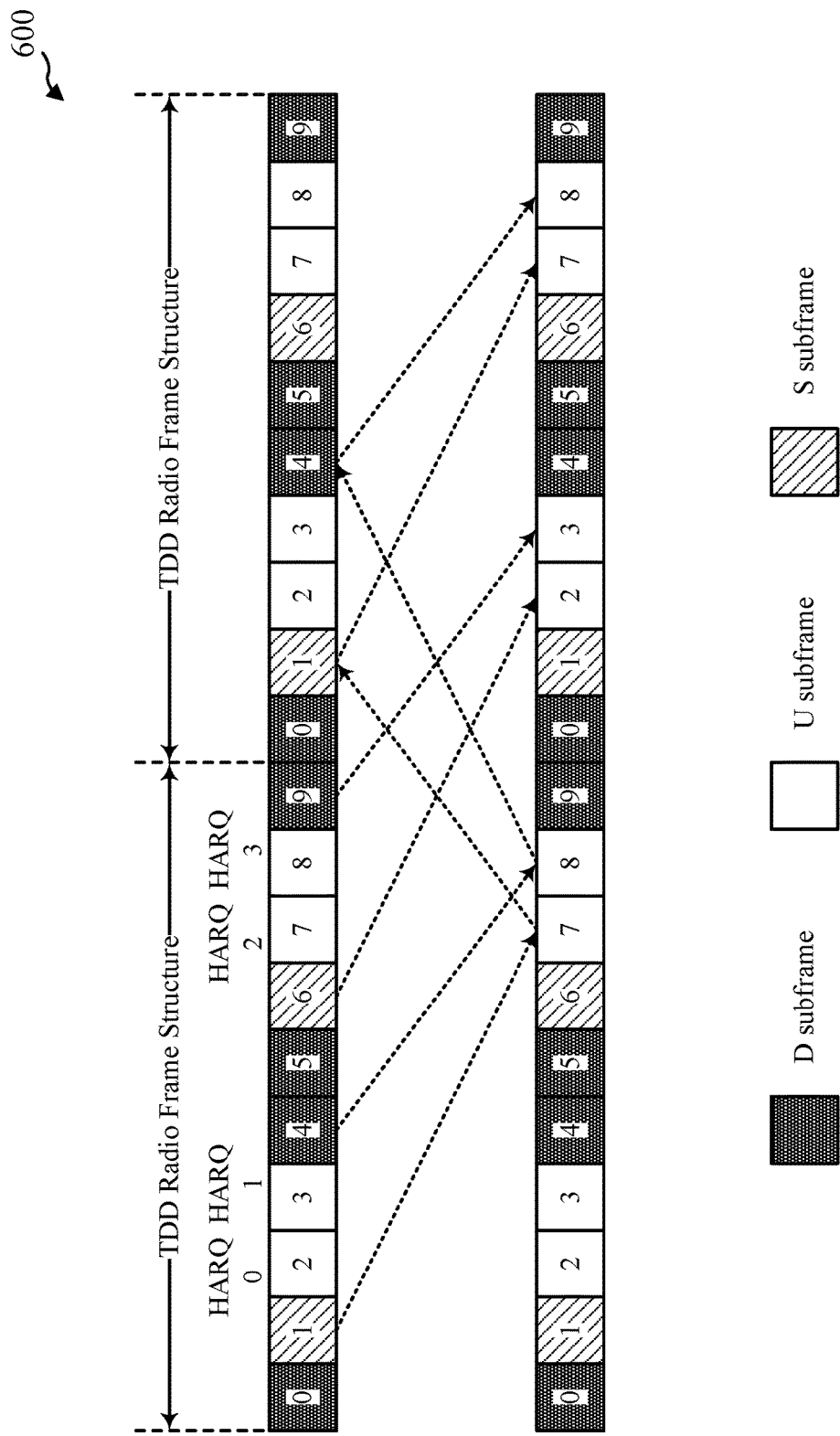
FIG. 6 shows a TDD radio frame structure having a DL-UL subframe configuration associated with a 5 ms switch-point periodicity, in accordance with various aspects of the present disclosure.

FIG. 6 shows a TDD radio frame structure 600 having a DL-UL subframe configuration associated with a 5 ms switch-point periodicity, in accordance with various aspects of the present disclosure. In some examples, the DL-UL subframe configuration may be an example of aspects of the DL-UL subframe configuration numbered 1 in FIG. 2. As shown, the DL-UL subframe configuration may include D subframes, U subframes, and S subframes.

An uplink transmission (e.g., a PUSCH) in each of the U subframes may be scheduled, at least in part, based on an uplink grant transmitted in an earlier-transmitted subframe. For example, an uplink transmission in subframe number 7 may be scheduled by an uplink grant transmitted during subframe number 1 of a current subframe, an uplink transmission in subframe number 8 may be scheduled by an uplink grant transmitted during subframe number 4 of a current subframe, an uplink transmission in subframe number 2 may be scheduled by an uplink grant transmitted during subframe number 6 of a prior subframe, and an uplink transmission in subframe number 3 may be scheduled by an uplink grant transmitted during subframe number 9 of a prior subframe. A separate uplink HARQ process may be determined for each of the uplink transmissions in a different subframe number (e.g., four HARQ processes may be determined for the TDD radio frame structure 600). For the DL-UL subframe configuration shown in FIG. 6, one uplink grant for one subframe may be transmitted in each of the downlink subframes numbered 1, 4, 6, and 9, and no uplink grant may be transmitted in the downlink subframes numbered 0 and 5. For the uplink heavy DL-UL subframe configuration numbered 0 in FIG. 2, two uplink grants for two different subframes may be transmitted in some downlink subframes.

Figure 7:
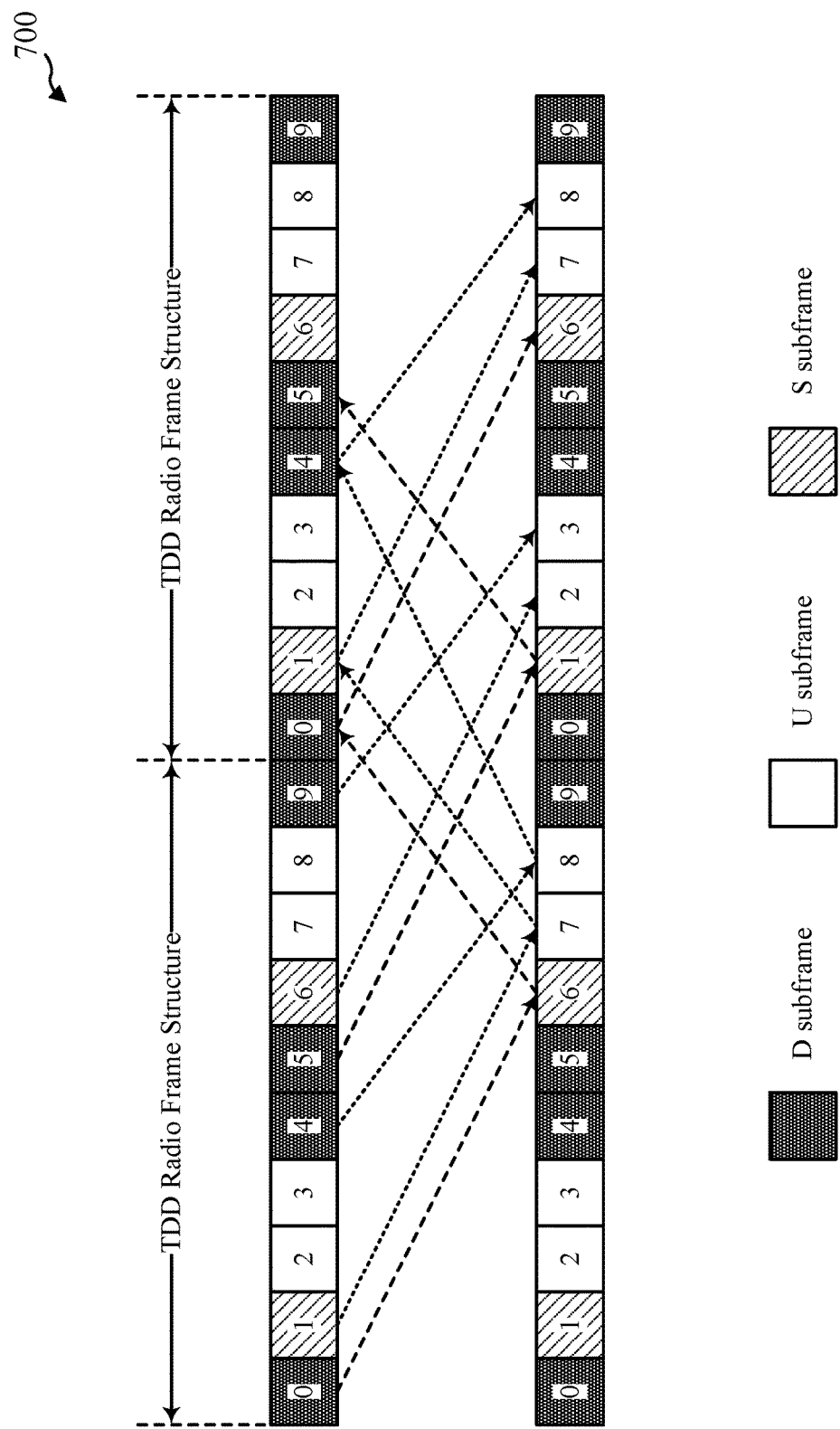
FIG. 7 shows a TDD radio frame structure having a DL-UL subframe configuration associated with a 5 ms switch-point periodicity, in accordance with various aspects of the present disclosure.

FIG. 7 shows a TDD radio frame structure 700 having a DL-UL subframe configuration associated with a 5 ms switch-point periodicity, in accordance with various aspects of the present disclosure. In some examples, the DL-UL subframe configuration may be an example of aspects of the DL-UL subframe configuration numbered 1 in FIG. 2. As shown, the DL-UL subframe configuration may include D subframes, U subframes, and S subframes. An uplink transmission (e.g., a PUSCH) may be scheduled for transmission in an UpPTS of each S subframe.

An uplink transmission (e.g., a PUSCH) in each of the U subframes may be scheduled, at least in part, based on an uplink grant transmitted in an earlier-transmitted subframe, as described, for example, with reference to FIG. 6. An uplink transmission in an UpPTS in each of the S subframes may, additionally or alternatively, be scheduled, at least in part, based on an uplink grant transmitted in an earlier-transmitted subframe. In some examples, base station 105 may transmit respective uplink grants for an UpPTS and its immediately-following U subframe in two adjacent D or S subframes. For example, an uplink transmission in an UpPTS in subframe number 6 may be scheduled by an uplink grant transmitted during subframe number 0 of a current subframe, and an uplink transmission in an UpPTS in subframe number 1 may be scheduled by an uplink grant transmitted during subframe number 5 of a prior subframe. A separate additional uplink HARQ process may be determined for each of the UpPTS uplink transmissions in a different subframe number (HARQ processes may be determined for the TDD radio frame structure 700). For the DL-UL subframe configuration shown in FIG. 7, one uplink grant for one subframe may be transmitted in each of the downlink subframes numbered 0, 1, 4, 5, 6, and 9. For the uplink heavy DL-UL subframe configuration numbered 0 in FIG. 2, two or three uplink grants for two or three different subframes may be transmitted in some downlink subframes.

Figure 8:
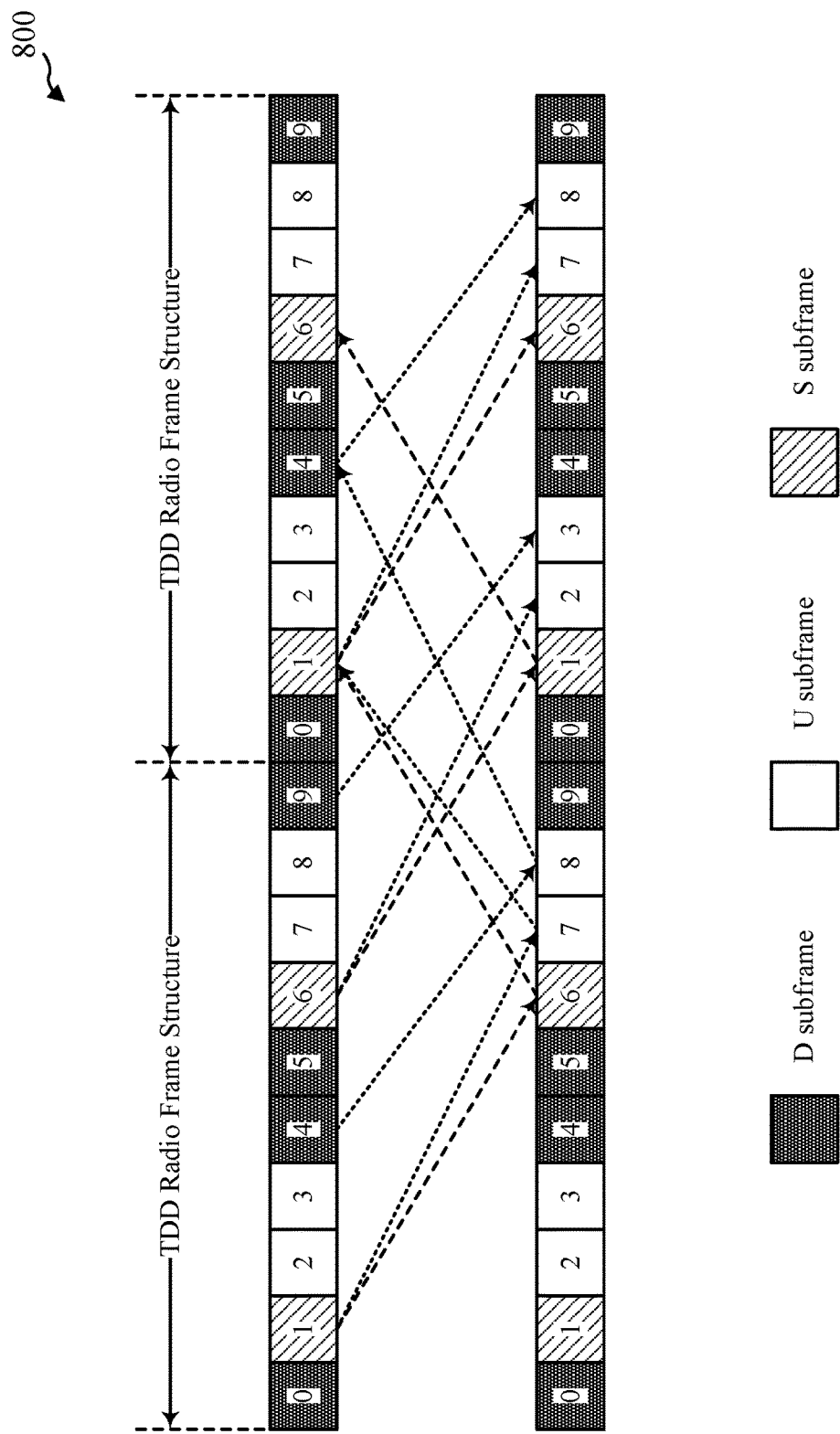
FIG. 8 shows a TDD radio frame structure having a DL-UL subframe configuration associated with a 5 ms switch-point periodicity, in accordance with various aspects of the present disclosure.

FIG. 8 shows a TDD radio frame structure 800 having a DL-UL subframe configuration associated with a 5 ms switch-point periodicity, in accordance with various aspects of the present disclosure. In some examples, the DL-UL subframe configuration may be an example of aspects of the DL-UL subframe configuration numbered 1 in FIG. 2. As shown, the DL-UL subframe configuration may include D subframes, U subframes, and S subframes. An uplink transmission (e.g., a PUSCH) may be scheduled for transmission in an UpPTS of each S subframe.

An uplink transmission (e.g., a PUSCH) in each of the U subframes may be scheduled, at least in part, based on an uplink grant transmitted in an earlier-transmitted subframe, as described, for example, with reference to FIG. 6. An uplink transmission in an UpPTS in each of the S subframes may, additionally or alternatively, be scheduled, at least in part, based on an uplink grant transmitted in an earlier-transmitted subframe. In some examples, base station 105 may transmit respective uplink grants for an UpPTS and its immediately following U subframe in the same D or S subframe. For example, an uplink transmission in an UpPTS in subframe number 6 may be scheduled by an uplink grant transmitted during subframe number 1 of a current subframe, and an uplink transmission in an UpPTS in subframe number 1 may be scheduled by an uplink grant transmitted during subframe number 6 of a prior subframe. A separate additional uplink HARQ process may be determined for each of the UpPTS uplink transmissions in a different subframe number (e.g., six HARQ processes may be determined for the TDD radio frame structure 800). For the DL-UL subframe configuration shown in FIG. 8, one uplink grant for one subframe may be transmitted in each of the downlink subframes numbered 4 and 9, two different uplink grants may be transmitted for two different subframes in each of the downlink subframes numbered 1 and 6, and no uplink grant may be transmitted in the downlink subframes numbered 0 and 5. Alternatively, a first combined uplink grant may be transmitted in subframe number 1, for a first uplink transmission in the UpPTS in subframe number 6 and for a second uplink transmission in subframe number 7 (or for a joint uplink transmission (e.g., a lengthened TTI transmission) spanning the UpPTS in subframe number 6 and the uplink portion of subframe number 7). Similarly, a second combined uplink grant may be transmitted in subframe number 6 for a first uplink transmission in the UpPTS in subframe number 1 and for a second uplink transmission in subframe number 2 (or for a joint uplink transmission (e.g., a lengthened TTI transmission) spanning the UpPTS in subframe number 1 and the uplink portion of subframe number 2). The transmission of separate uplink grants may be useful in that an UpPTS occupying a portion of a subframe (e.g., less than one slot) may have different resource availability conditions than an uplink subframe (occupying two slots). For the uplink heavy DL-UL subframe configuration numbered 0 in FIG. 2, two or three uplink grants for two or three different subframes may be transmitted in some downlink subframes. However, a UE monitoring for the uplink grants may perform the same number of blind decodes regardless of the number of uplink grants transmitted in a downlink subframe.

When uplink grants for UpPTSs' are transmitted as described with reference to FIG. 8, the uplink scheduling timing for the UpPTS may be reduced by about 0.5 ms compared to the uplink scheduling timing for which an uplink grant is transmitted in the same downlink subframe. To maximize the uplink scheduling time for the UpPTS, a first uplink grant for the UpPTS may be transmitted in a PDCCH, and a second uplink grant for the uplink subframe (transmitted in the same downlink subframe as the first uplink grant) may be transmitted in the PDCCH or in an EPDCCH.

Referring again to the TDD radio frame structure 800 described with reference to FIG. 8, the timing of a next PDCCH or PHICH following an uplink transmission (e.g., a PUSCH transmission) in an UpPTS may be the same as the timing of a next PDCCH of PHICH following an uplink transmission (e.g., a PUSCH transmission) in the uplink subframe following the UpPTS. For example, the next PDCCH or PHICH following an uplink transmission in an UpPTS in subframe number 6, and the next PDCCH or PHICH following an uplink transmission in subframe number 7, may be scheduled in subframe number 1. Similarly, the next PDCCH or PHICH following an uplink transmission in an UpPTS in subframe number 1, and the next PDCCH or PHICH following an uplink transmission in subframe number 2, may be scheduled in subframe number 6.

In some examples, when PHICH may be supported for PUSCH in subframe number 1 or subframe number 6, the same PHICH response may be applicable to both subframe number 1 and subframe number 2 (or to both subframe number 6 and subframe number 7). In some examples, acknowledgement/non-acknowledgement (ACK/NAK) bundling may be used. For example, if the uplink transmissions in both subframe number 1 and subframe number 2 (or both subframe number 6 and subframe number 7) are acknowledged, a shared PHICH resource may be set to ACK, and otherwise, the shared PHICH resource may be set to NAK. The shared PHICH resource may be a PHICH resource already allocated for subframe number 2 (or subframe 7). Alternatively, subframe number 1 and subframe number 2 (or subframe number 6 and subframe number 7) may be allocated separate PHICH resources (e.g., separate PHICH resources based on the starting physical resource blocks (PRBs) and DM-RS cyclic shifts used for subframe number 1 and subframe number 7 (or subframe number 6 and subframe number 7). The separate PHICH resources for subframe number 1 (or subframe number 6) may, additionally or alternatively, be based on an offset (e.g., a hardcoded offset, or RRC configured offset, or dynamically indicated offset), to additionally or alternatively minimize the likelihood of collision with PHICH resources for other subframes. Alternatively, no PHICH resource may be provided for an uplink transmission (e.g., a PUSCH transmission) in an UpPTS, and no provision may be made for a PHICH-based re-transmission of an uplink transmission transmitted in an UpPTS. Instead, a re-transmission may be scheduled using at least one of a PDCCH, or an EPDCCH, or an asynchronous uplink HARQ operation.

The TDD radio frame structure 700 may be useful in that the number of uplink grants transmitted per subframe may be minimized. The TDD radio frame structure 800 described with reference to FIG. 8 may be useful in that the transmission of uplink grants may be limited to subframes in which uplink grants are transmitted regardless of whether an uplink transmission (e.g., a PUSCH) is transmitted in an UpPTS of a S subframe.

In some examples, a same DCI size scheduling may be allocated for a PUSCH scheduled for transmission in an UpPTS as a PUSCH scheduled for transmission in an uplink subframe (e.g., in one of the U subframes described with reference to FIG. 2). In some examples, resource allocation for a PUSCH scheduled for transmission in an UpPTS may be the same as resource allocation for a PUSCH scheduled for transmission in an uplink subframe (e.g., with both PUSCH transmissions being scheduled with a same RB granularity). In other examples, resource allocation for a PUSCH scheduled for transmission in an UpPTS may be differ from resource allocation for a PUSCH scheduled for transmission in an uplink subframe. For example, the resource allocation for the PUSCH scheduled for transmission in the UpPTS may have a multiple RB granularity (e.g., a two RB granularity).

In some examples, a same transmit power control (TPC) command may be used for transmission of a PUSCH in an uplink subframe or an UpPTS. When the scheduling timing for the PUSCH transmitted in the UpPTS is less than 4 ms, the TPC command may be applied with the same timing (i.e., less than 4 ms).

In some examples, the same open-loop or closed-loop power control may be used for an uplink subframe and an UpPTS (or to a S subframe including an UpPTS). When two or more subframe sets are configured for power control, each subframe including an UpPTS may be included in a different one of the sets.

Figure 9:
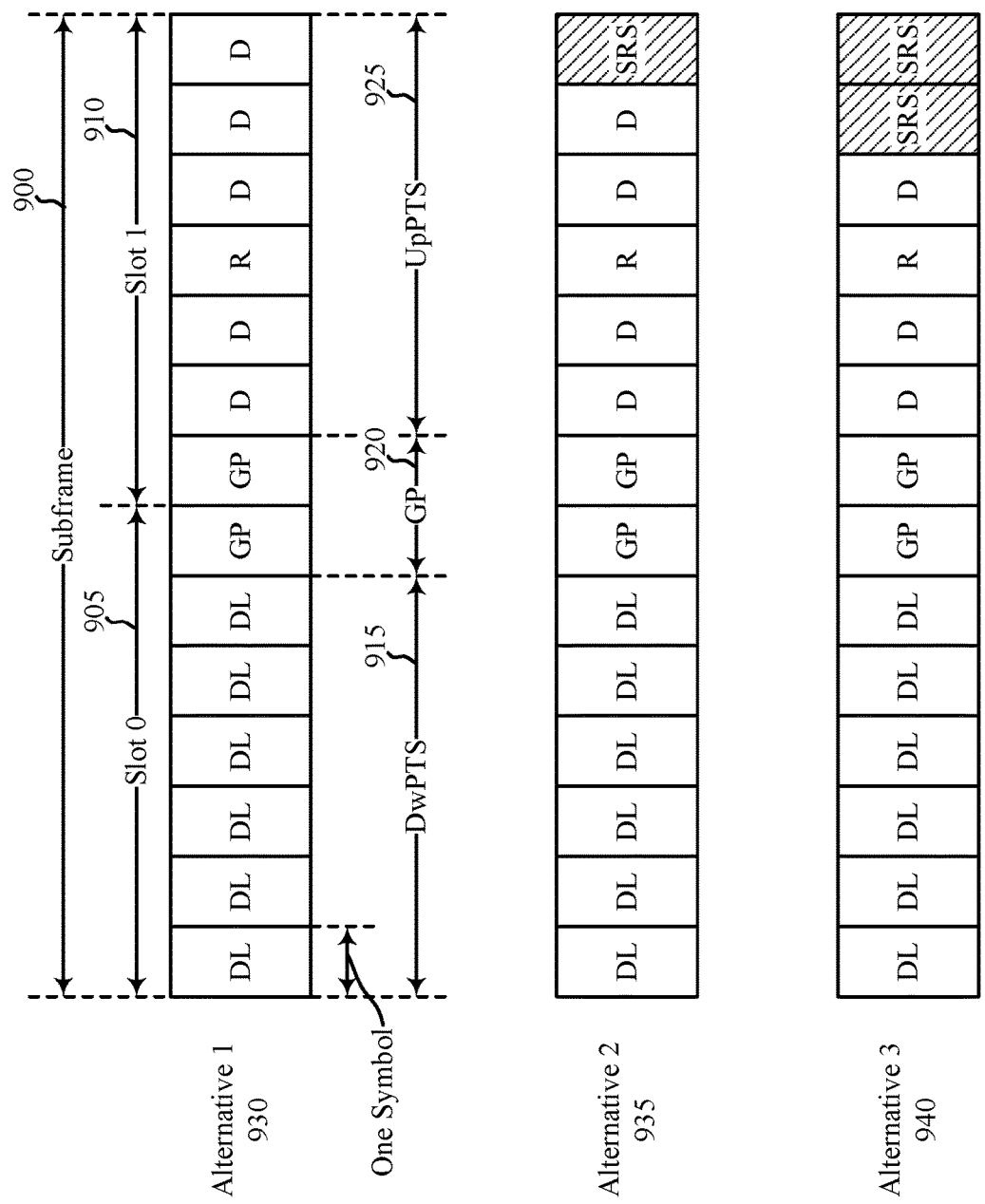
FIG. 9 shows alternative configurations of a subframe including an UpPTS, in accordance with various aspects of the present disclosure.

FIG. 9 shows alternative configurations of a subframe 900 including an UpPTS, in accordance with various aspects of the present disclosure. In some examples, the subframe 900 may be an example of aspects of one of the S subframes included in one of the DL-UL subframe configurations described with reference to FIG. 2. The subframe 900 may include a first slot 905 (Slot 0) followed by a second slot 910 (Slot 1). The subframe 900 may include a DwPTS 915 within the first slot 905, followed by a two symbol GP 920 spanning the first slot 905 and the second slot 910, followed by an UpPTS 925 within the second slot 910. A PUSCH may be transmitted during the UpPTS 925. In some examples, the subframe 900 may have a duration of 1 ms.

In Alternative 1 930 of the subframe 900, a first UE that is transmitting a PUSCH during the UpPTS 925 may not transmit a SRS during the UpPTS 925. However, a second UE that is simultaneously (i.e., simultaneously to the first UE) not transmitting a PUSCH during the UpPTS 925 may transmit a SR during the UpPTS 925.

In Alternative 2 935 and Alternative 3 940 of the subframe 900, a UE that is transmitting a PUSCH during the UpPTS 925 may transmit a SRS during the UpPTS 925. In Alternative 2 935, a SRS may be transmitted during a temporally last symbol period of the UpPTS 925. In Alternative 3 940, a SRS may be transmitted during a temporally last two symbol periods of the UpPTS 925. A UE that transmits a PUSCH during the UpPTS 925 may or may not map a modulation symbol of a PUSCH configuration to a symbol period in which a SRS is transmitted (e.g., a modulation symbol of a PUSCH configuration may be punctured by a SRS or the modulation symbols of a PUSCH configuration may be rate-matched around a symbol period in which a SRS may be transmitted. In some examples, the modulation symbols of a PUSCH may not be transmitted in a symbol period in which a SRS may be transmitted by another UE, despite a SRS not being transmitted in the symbol period by a UE that is not transmitting a SRS. In some examples, a periodic SRS or an aperiodic SRS may be transmitted during the UpPTS 925. Transmission of the SRS may be scheduled (triggered) by a network access device, or triggered by a UE (e.g., for an aperiodic channel quality information (CQI) report).

In some examples, a PUCCH may be transmitted during an UpPTS. In some examples, a downlink HARQ timing may be defined for a PUCCH transmitted during an UpPTS. In other examples, downlink HARQ may not be transmitted during a PUCCH transmitted in an UpPTS, but information such as periodic channel state information (CSI) or a SR may be transmitted in the PUCCH.

In some examples, a PRACH may be transmitted during an UpPTS. In some examples, a PRACH format 4 may be transmitted in the last two symbol periods of an UpPTS. In other examples, a PRACH format 4 or other PRACH format may be transmitted in other symbol periods or additional symbol periods (e.g., more than two symbol periods) of an UpPTS.

In some examples, semi-persistent scheduling (SPS) may not be support in an UpPTS. When support, the same transport block may be re-transmitted/transmitted in uplink subframes as well as in an UpPTS.

In some examples, a PUSCH transmission may span two or more subframes. A PUSCH transmission may, additionally or alternatively, span an UpPTS in combination with one or more uplink subframes. In the latter examples, TTI bundling (or extensive TTI bundling for eMTC UEs or NB-IOT UEs) may or may not be supported. When TTI bundling (or extensive TTI bundling) including an UpPTS may be supported, the resources of the UpPTS may in some examples have a different granularity than the resources of an uplink subframe. For example, a 3-RB resource in an uplink subframe may be bundled with a 6-RB resource in an UpPTS.

In some examples, MIMO operation (e.g., MIMO operation with up to four layers) may be supported in an UpPTS. An OCC framework similar to that used over the two slots of a subframe may be supported when a demodulation reference signal may be transmitted during each of two symbol periods of the UpPTS. Otherwise, when a demodulation reference signal may be transmitted in a single symbol period of an UpPTS, the UpPTS may take an OCC defined for a first slot (e.g., a slot 0) or a second slot (e.g., a slot 1) of an uplink subframe.

In some examples, the transmission of aperiodic CQI or aperiodic SRS in an UpPTS may be supported. In some examples, there may be a restriction on transmitting aperiodic CQI or aperiodic SRS in an UpPTS. The restriction may be based on a transmission during an uplink subframe (e.g., a U subframe described with reference to FIG. 2) following the UpPTS. For example, the restriction may restrict the transmission of aperiodic CQI or aperiodic SRS (or restrict the transmission of the same aperiodic CQI (e.g., a CQI report for the same CC) or the same aperiodic SRS (e.g., aperiodic SRS using the same SRS resources)) in an UpPTS when aperiodic CQI or aperiodic SRS (or the same aperiodic CQI or aperiodic SRS) may be scheduled to be transmitted in the uplink subframe following the UpPTS. In other examples, there may not be a restriction on transmitting aperiodic CQI or aperiodic SRS in an UpPTS.

For a transmission of aperiodic CSI without a transmission of an uplink shared channel (UL-SCH) during an UpPTS, the conditions with respect to the number of RBs used for the aperiodic CSI may be defined differently than for an uplink subframe (e.g., a U subframe described with reference to FIG. 2). For example, when using up to five CC CA, 20 or fewer RBs may be used as one condition to determine aperiodic CSI in a U subframe, and 40 or fewer RBs may be used to determine aperiodic CSI in an UpPTS.

Figure 10:
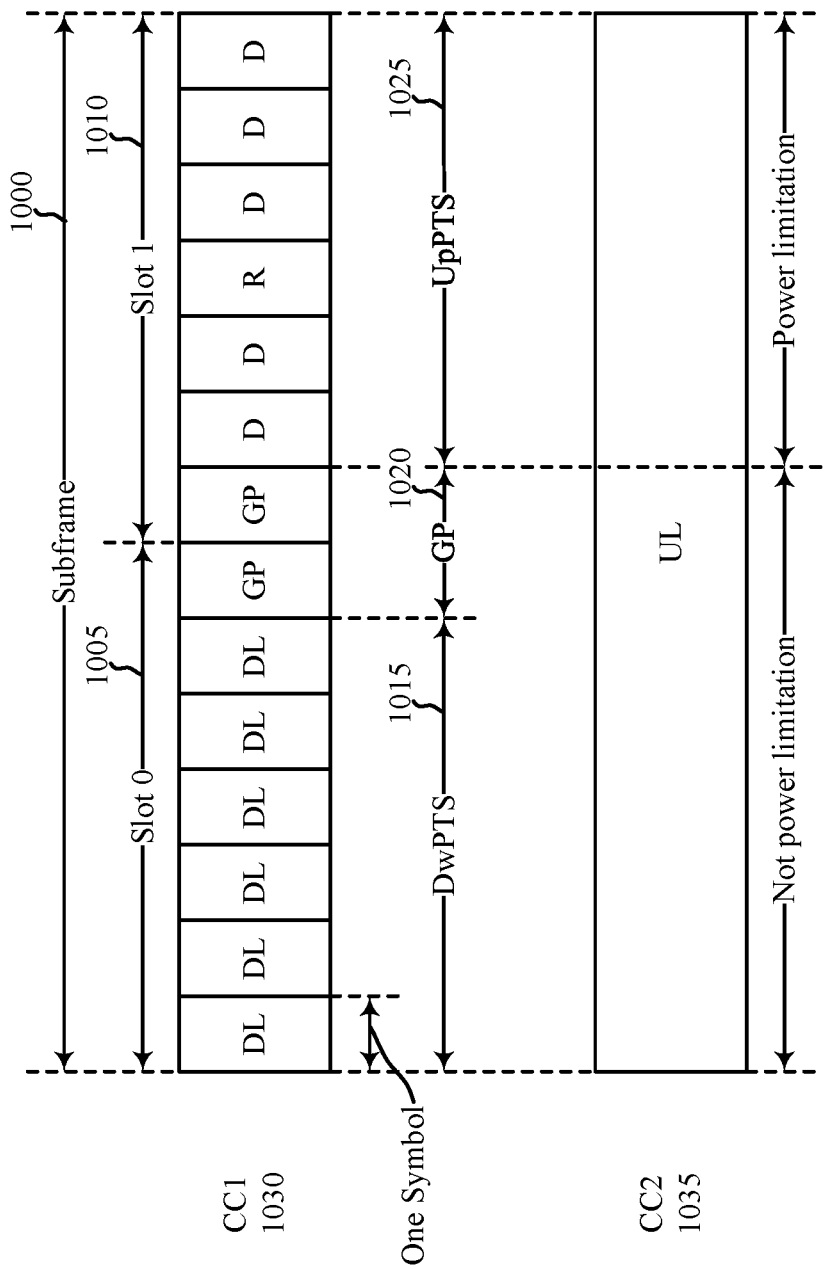
FIG. 10 shows a set of component carriers (CCs) transmitted during a subframe including an UpPTS, in accordance with various aspects of the present disclosure.

FIG. 10 shows a set of component carriers (CCs) transmitted during a subframe 1000 including an UpPTS, in accordance with various aspects of the present disclosure. In some examples, the subframe 1000 may be an example of aspects of one of the S subframes included in one of the DL-UL subframe configurations described with reference to FIG. 2. The subframe 1000 may include a first slot 1005 (Slot 0) followed by a second slot 1010 (Slot 1). In some examples, the subframe 1000 may have a duration of 1 ms.

During the subframe 1000, a first CC (CC1 1030) may include a DwPTS 1015 scheduled within the first slot 1005, followed by a two symbol GP 1020 spanning the first slot 1005 and the second slot 1010, followed by an UpPTS 1025 scheduled within the second slot 1010. A PUSCH may be transmitted during the UpPTS 1025. Additionally or alternatively, during the subframe 1000, a second CC (CC2 1035) may be transmitted. In such an example, there may be a power limiting scenario (e.g., a scenario in which the required transmit power for a CC is greater than the maximum power available for the CC) where an uplink subframe transmitted on CC2 1035 during the subframe 1000 (e.g., from a FDD CC) collides with a transmission in the UpPTS 1025 of CC1 1030. In some examples, there may be no power limiting scenario in the first slot 1005, but a power limiting scenario in the second slot 1010. In such an example, transmit power may be scaled for the entirety of subframe 1000 or just for the second slot 1010. Transmit power scaling for just the second slot 1001 may be possible just for quadrature phase-shift keying (QPSK), since for 16 quadrature amplitude modulation (16QAM) and above, a network access device (e.g., a base station) may not be able to combine soft channel bits from the first slot 1005 and the second slot 1010 appropriately if the first slot 1005 and the second slot 1010 are associated with different transmit powers.

Figure 11:
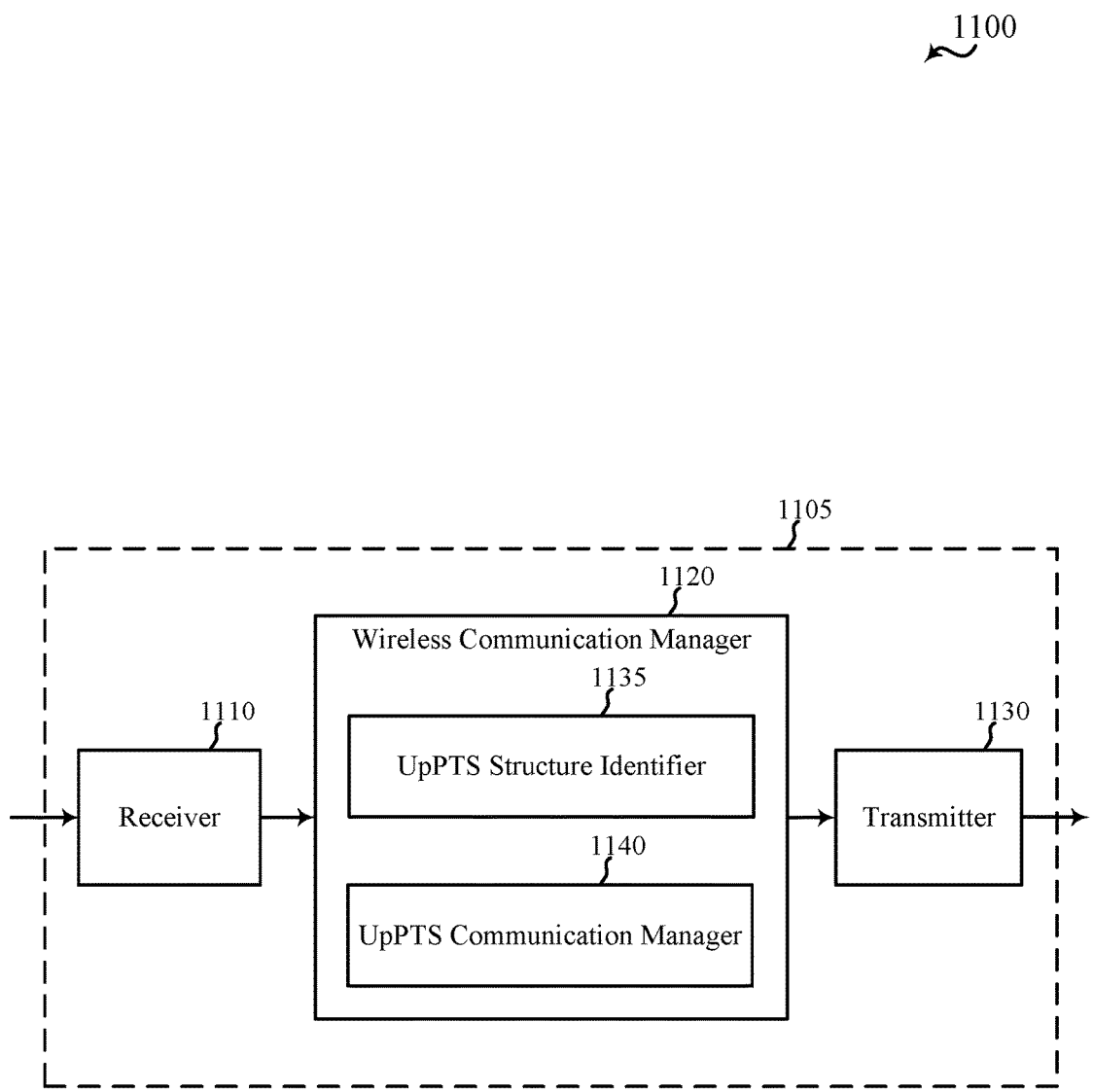
FIG. 11 shows a block diagram of an apparatus for use in wireless communication, in accordance with various aspects of the present disclosure.

FIG. 11 shows a block diagram 1100 of an apparatus 1105 for use in wireless communication, in accordance with various aspects of the present disclosure. The apparatus 1105 may be an example of aspects of a network access device, such as one or more of the base stations 105 described with reference to FIG. 1. The apparatus 1105 may additionally be or include a processor. The apparatus 1105 may include a receiver 1110, a wireless communication manager 1120, or a transmitter 1130. Each of these components may be in communication with each other.

The components of the apparatus 1105 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, others of integrated circuits may be used (e.g., Structured/Platform ASICs, Field Programmable Gate Arrays (FPGAs), a System on Chip (SoC), and/or others of Semi-Custom ICs), which may be programmed in any manner known in the art. The functions of each component may additionally or alternatively be implemented, in whole or in part, with instructions embodied in a memory, formatted to be executed by one or more general or application-specific processors.

In some examples, the receiver 1110 may include at least one RF receiver, such as at least one RF receiver operable to receive transmissions over at least one radio frequency spectrum band. In some examples, one or more of the at least one radio frequency spectrum band may be used for LTE/LTE-A communications, as described, for example, with reference to FIG. 1, 2, 3, 4, 5, 6, 7, 8, 9, or 10. The receiver 1110 may be used to receive various data or control signals (i.e., transmissions) over one or more communication links of a wireless communication system, such as one or more communication links of the wireless communication system 100 described with reference to FIG. 1.

In some examples, the transmitter 1130 may include at least one RF transmitter, such as at least one RF transmitter operable to transmit over at least one radio frequency spectrum band. The transmitter 1130 may be used to transmit various data or control signals (i.e., transmissions) over one or more communication links of a wireless communication system, such as one or more communication links of the wireless communication system 100 described with reference to FIG. 1.

In some examples, the wireless communication manager 1120 may be used to manage one or more aspects of wireless communication for the apparatus 1105. In some examples, part of the wireless communication manager 1120 may be incorporated into or shared with the receiver 1110 or the transmitter 1130. In some examples, the wireless communication manager 1120 may include an UpPTS structure identifier 1135 or an UpPTS communication manager 1140.

The UpPTS structure identifier 1135 may be used to identify, at the apparatus 1105, a data structure associated with an UpPTS and a demodulation reference signal structure associated with the UpPTS. The UpPTS may occur during a portion of a subframe.

The UpPTS communication manager 1140 may be used to communicate with a second apparatus (e.g., an apparatus associated with a UE) based on the data structure and the demodulation reference signal structure identified by the UpPTS structure identifier 1135.

Figure 12:
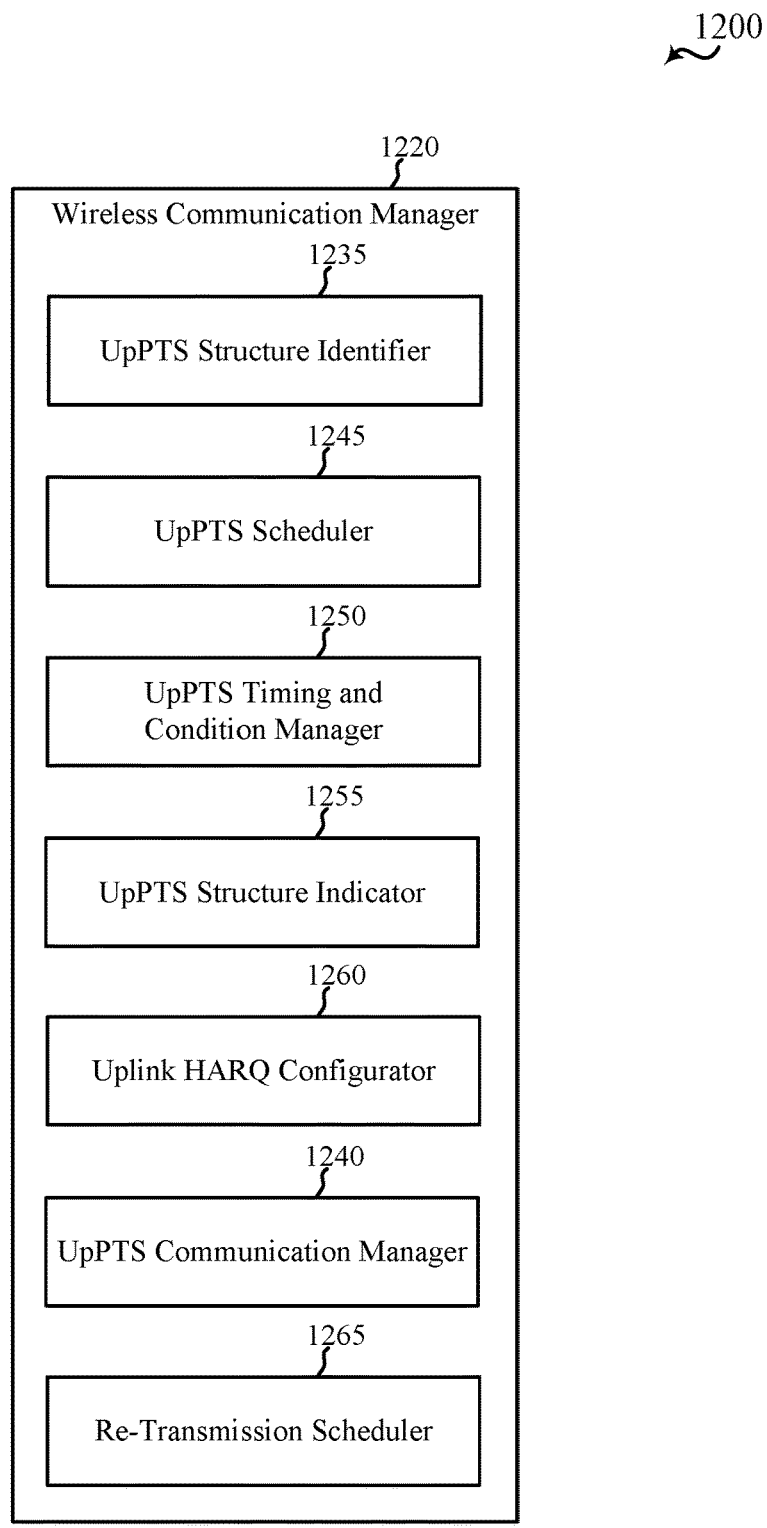
FIG. 12 shows a block diagram of a wireless communication manager for use in wireless communication, in accordance with various aspects of the present disclosure.

FIG. 12 shows a block diagram 1200 of a wireless communication manager 1220 for use in wireless communication, in accordance with various aspects of the present disclosure. The wireless communication manager 1220 may be an example of aspects of the wireless communication manager 1120 described with reference to FIG. 11.

The components of the wireless communication manager 1220 may, individually or collectively, be implemented using one or more ASICs adapted to perform some or all of the applicable functions in hardware. Alternatively, the functions may be performed by one or more other processing units (or cores), on one or more integrated circuits. In some other examples, other types of integrated circuits may be used (e.g., Structured/Platform ASICs, FPGAs, a SoC, and/or other types of Semi-Custom ICs), which may be programmed in any manner known in the art. The functions of each component may, additionally or alternatively, be implemented, in whole or in part, with instructions embodied in a memory, formatted to be executed by one or more general or application-specific processors.

In some examples, the wireless communication manager 1220 may be used to manage one or more aspects of wireless communication for a network access device or apparatus, such as one of the base stations 105 described with reference to FIG. 1, or one of the apparatus 1105 described with reference to FIG. 11. In some examples, part of the wireless communication manager 1220 may be incorporated into or shared with a receiver or a transmitter (e.g., the receiver 1110 or the transmitter 1130 described with reference to FIG. 11). In some examples, the wireless communication manager 1220 may include an UpPTS structure identifier 1235, an UpPTS scheduler 1245, an UpPTS timing and condition manager 1250, an UpPTS structure indicator 1255, an uplink HARQ configurator 1260, an UpPTS communication manager 1240, or a re-transmission scheduler 1265.

The UpPTS structure identifier 1235 may be used to identify, at a first apparatus including the wireless communication manager 1220 (e.g., a network access device, such as a base station), a data structure associated with an UpPTS and a demodulation reference signal structure associated with the UpPTS. The UpPTS may occur during a portion of a subframe (e.g., during a portion of a S subframe described with reference to FIG. 2).

In some examples, identifying the data structure and the demodulation reference signal structure associated with the UpPTS, using the UpPTS structure identifier 1235, may include identifying a data structure and a demodulation reference signal structure of a PUSCH scheduled for transmission in the UpPTS. In some examples, identifying the data structure and the demodulation reference signal structure of the PUSCH may include mapping a subset of modulation symbols of a nominal PUSCH configuration for a slot of the subframe to the UpPTS. In some examples, the subset of modulation symbols may include one of: a temporally last subset of modulation symbols of the nominal PUSCH configuration for the slot, or a temporally first subset of modulation symbols of the nominal PUSCH configuration for the slot. In some examples, identifying the data structure and the demodulation reference signal structure associated with the UpPTS may include identifying that the UpPTS includes a six symbol period UpPTS and identifying a demodulation reference signal transmission mapped to one of: a temporally third symbol period of the six symbol period UpPTS, or a temporally fourth symbol period of the six symbol period UpPTS, or a temporally second symbol period and a temporally fifth symbol period of the six symbol period UpPTS, or two symbol periods of the six symbol period UpPTS, or at least a temporally first symbol period of the six symbol period UpPTS.

In some examples, the UpPTS may occur prior to an uplink subframe (e.g., a U subframe described with reference to FIG. 2). In these examples, identifying the data structure and the demodulation reference signal structure of the PUSCH, using the UpPTS structure identifier 1235, may include identifying a PUSCH transport block configured for a TTI having a first duration equal to or less than a second duration of a single uplink subframe. Alternatively, identifying the data structure and the demodulation reference signal structure of the PUSCH, using the UpPTS structure identifier 1235, may include identifying a PUSCH transport block configured for a TTI spanning at least a portion of the UpPTS and at least a portion of the uplink subframe following the UpPTS. In some examples, the UpPTS structure identifier 1235 may be used to allocate resources of the PUSCH based on a multiple resource block granularity.

The UpPTS scheduler 1245 may be used to allocate a same DCI size scheduling for the PUSCH scheduled for transmission in the UpPTS and at least one additional PUSCH scheduled for transmission in an uplink subframe. The UpPTS scheduler 1245 may, additionally or alternatively, be used to schedule the PUSCH scheduled for transmission in the UpPTS in an earlier-transmitted subframe, where the earlier-transmitted subframe is transmitted prior to the subframe including the PUSCH. In some examples, UpPTS scheduler 1245 may schedule transmission of respective uplink grants for an UpPTS and its immediately following U subframe in two adjacent D or S subframe. Alternatively, UpPTS scheduler 1245 may schedule transmission of respective uplink grants for an UpPTS and its immediately following U subframe in a same D or S subframe. In some examples, scheduling the PUSCH scheduled for transmission in the UpPTS in the earlier-transmitted subframe may include transmitting, in the earlier-transmitted subframe, an uplink grant for the PUSCH scheduled for transmission in the UpPTS. In some examples, the uplink grant for the PUSCH scheduled for transmission in the UpPTS may be an only uplink grant transmitted in the earlier-transmitted subframe. In some examples, the UpPTS scheduler 1245 may transmit, in the earlier-transmitted subframe, at least one additional uplink grant for at least one additional PUSCH scheduled in at least one additional subframe (e.g., in at least one subframe other than the subframe including the UpPTS). In some examples, the UpPTS scheduler 1245 may allocate: a separate PHICH resource or a shared PHICH resource for the PUSCH transmitted in the UpPTS, where the shared PHICH resource is shared with the at least one additional PUSCH. In some examples, the uplink grant for the PUSCH scheduled for transmission in the UpPTS may schedule at least one additional PUSCH scheduled in at least one additional subframe (e.g., at least one subframe other than the subframe including the UpPTS). In some examples, the uplink grant may be transmitted in a PDCCH.

The uplink HARQ configurator 1260 may be used to configure a separate HARQ process for the PUSCH scheduled for transmission in the UpPTS. The UpPTS timing and condition manager 1250 may be used to identify various timings and/or conditions of the UpPTS. In some examples, the UpPTS timing and condition manager 1250 may be used to identify a timing of a SRS transmitted during the UpPTS. In some examples, the UpPTS timing and condition manager 1250 may be used to identify a timing of a PUCCH transmitted during the UpPTS, and identifying at least one of: CS, a SR, or a combination thereof transmitted in the PUCCH. In some examples, the UpPTS timing and condition manager 1250 may be used to identify a timing of PRACH resources in more than two symbol periods of the UpPTS. In some examples, the UpPTS timing and condition manager 1250 may be used to identify a bundling of at least a first resource of the PUSCH scheduled for transmission in the UpPTS with at least a second resource of at least one additional PUSCH scheduled for at least one additional subframe (e.g., at least one subframe other than the subframe including the UpPTS). In some examples, the first resource may have a first resource granularity that differs from a second resource granularity of the second resource. In some examples, the UpPTS may occur prior to an uplink subframe, and the method may include identifying a restriction on a transmission, during the UpPTS, of at least one of: aperiodic CQI, or an aperiodic SRS, or a combination thereof. The restriction may be based on a transmission during the uplink subframe. In some examples, the UpPTS timing and condition manager 1250 may be used to scale a transmit power of the subframe at a subframe-level or at a slot-level.

The UpPTS structure indicator 1255 may be used to provide an indication of the identified data structure and the demodulation reference signal structure of the PUSCH scheduled for transmission in the UpPTS to a UE.

The UpPTS communication manager 1240 may be used to communicate with a second apparatus (e.g., an apparatus associated with a UE) based on the data structure and the demodulation reference signal structure identified by the UpPTS structure identifier 1235.

The re-transmission scheduler 1265 may be used to schedule a re-transmission of the PUSCH transmitted in the UpPTS using at least one of: a PDCCH, or an EPDCCH, or an asynchronous uplink HARQ operation.

Figure 13:
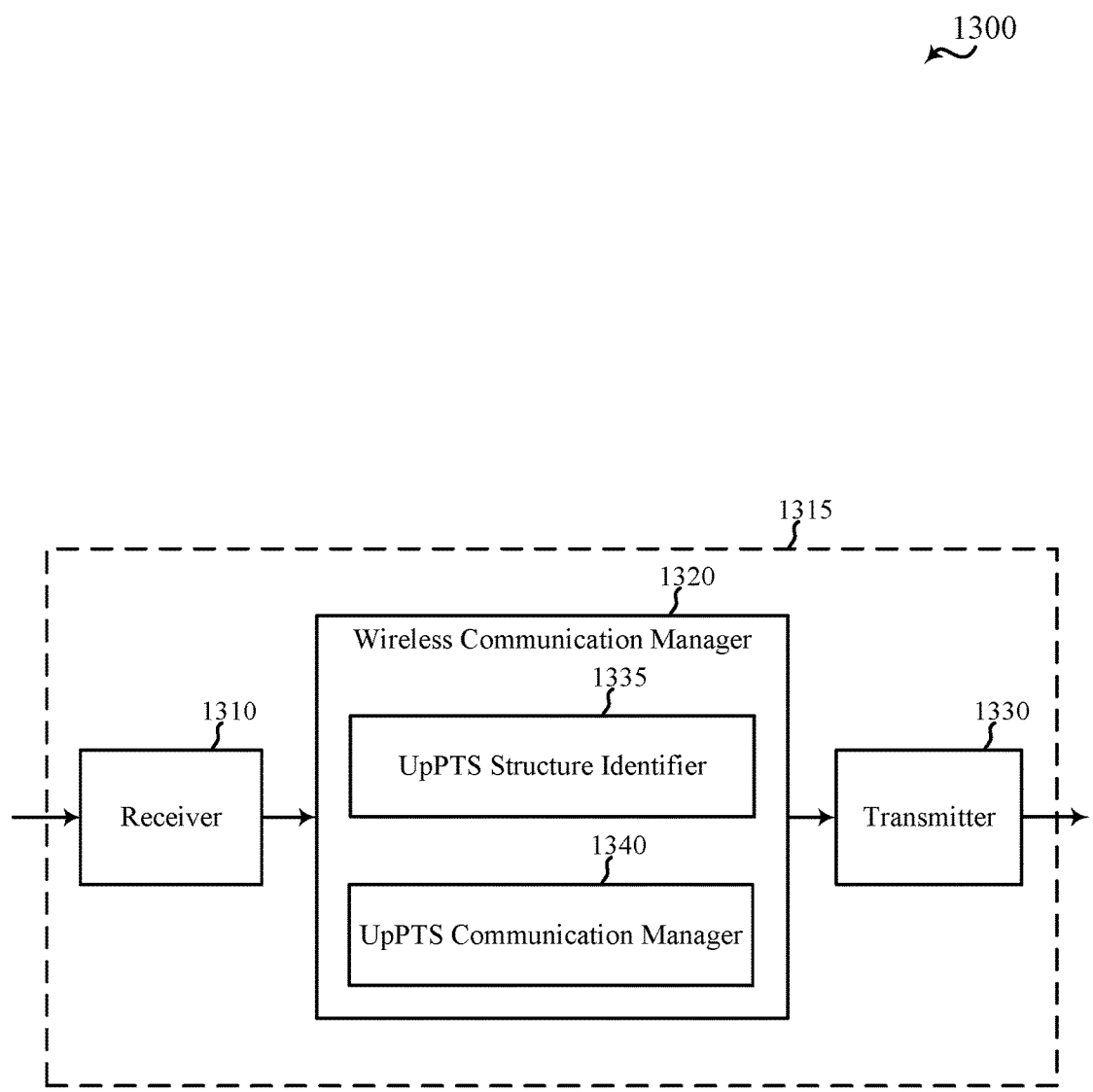
FIG. 13 shows a block diagram of an apparatus for use in wireless communication, in accordance with various aspects of the present disclosure.

FIG. 13 shows a block diagram 1300 of an apparatus 1315 for use in wireless communication, in accordance with various aspects of the present disclosure. The apparatus 1315 may be an example of aspects of one or more of the UEs 115 described with reference to FIG. 1. The apparatus 1315 may, additionally or alternatively, be or include a processor. The apparatus 1315 may include a receiver 1310, a wireless communication manager 1320, or a transmitter 1330. Each of these components may be in communication with each other.

The components of the apparatus 1315 may, individually or collectively, be implemented using one or more ASICs adapted to perform some or all of the applicable functions in hardware. Alternatively, the functions may be performed by one or more other processing units (or cores), on one or more integrated circuits. In other examples, others of integrated circuits may be used (e.g., Structured/Platform ASICs, FPGAs, a SoC, and/or others of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 1310 may include at least one RF receiver, such as at least one RF receiver operable to receive transmissions over at least one radio frequency spectrum band. In some examples, one or more of the at least one radio frequency spectrum band may be used for LTE/LTE-A communications, as described, for example, with reference to FIG. 1, 2, 3, 4, 5, 6, 7, 8, 9, or 10. The receiver 1310 may be used to receive various data or control signals (i.e., transmissions) over one or more communication links of a wireless communication system, such as one or more communication links of the wireless communication system 100 described with reference to FIG. 1.

In some examples, the transmitter 1330 may include at least one RF transmitter, such as at least one RF transmitter operable to transmit over at least one radio frequency spectrum band. The transmitter 1330 may be used to transmit various data or control signals (i.e., transmissions) over one or more communication links of a wireless communication system, such as one or more communication links of the wireless communication system 100 described with reference to FIG. 1.

In some examples, the wireless communication manager 1320 may be used to manage one or more aspects of wireless communication for the apparatus 1315. In some examples, part of the wireless communication manager 1320 may be incorporated into or shared with the receiver 1310 or the transmitter 1330. In some examples, the wireless communication manager 1320 may include an UpPTS structure identifier 1335 or an UpPTS communication manager 1340.

The UpPTS structure identifier 1335 may be used to identify, at the apparatus 1315, a data structure associated with an UpPTS and a demodulation reference signal structure associated with the UpPTS. The UpPTS may occur during a portion of a subframe.

The UpPTS communication manager 1340 may be used to communicate with a second apparatus (e.g., an apparatus associated with a network access device, such as a base station) based on the data structure and the demodulation reference signal structure identified by the UpPTS structure identifier 1335.

Figure 14:
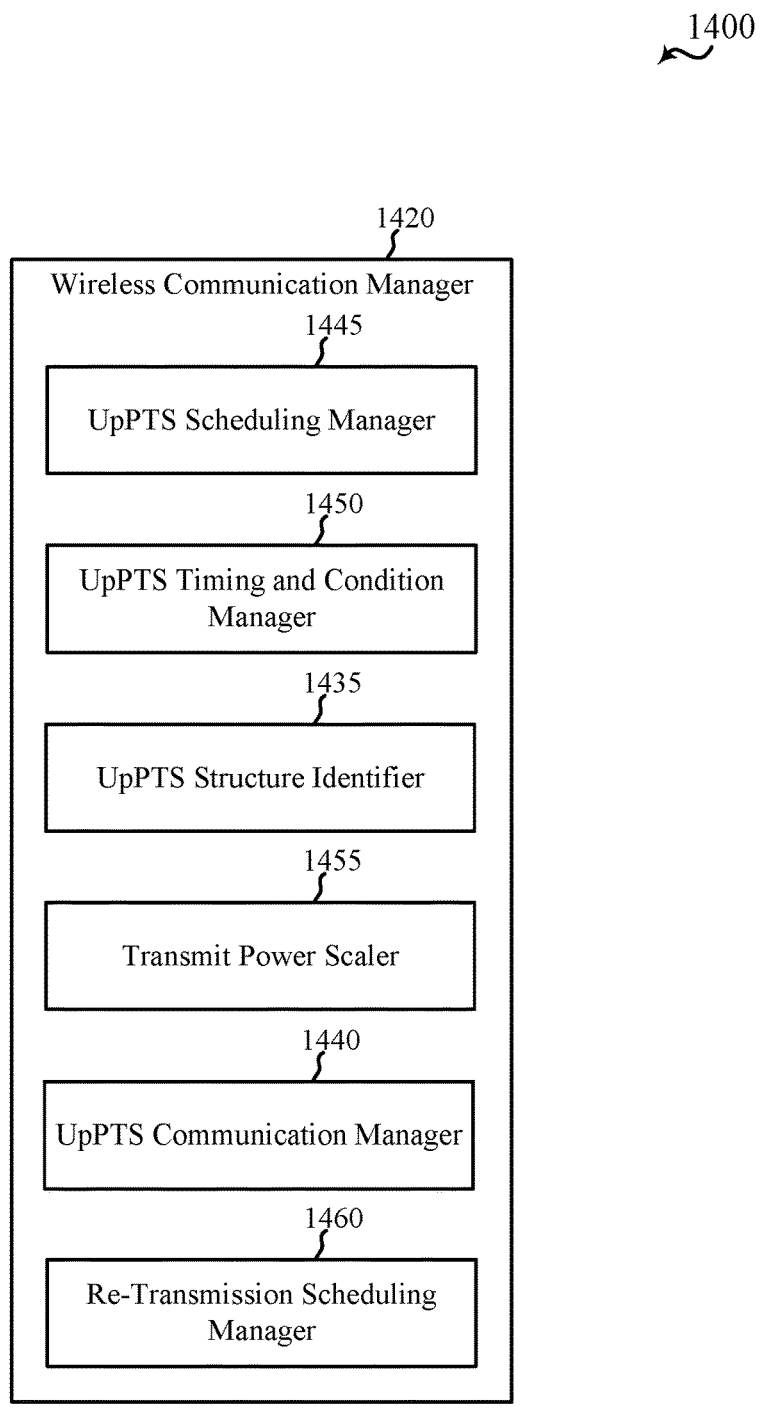
FIG. 14 shows a block diagram of a wireless communication manager for use in wireless communication, in accordance with various aspects of the present disclosure.

FIG. 14 shows a block diagram 1400 of a wireless communication manager 1420 for use in wireless communication, in accordance with various aspects of the present disclosure. The wireless communication manager 1420 may be an example of aspects of the wireless communication manager 1320 described with reference to FIG. 13.

The components of the wireless communication manager 1420 may, individually or collectively, be implemented using one or more ASICs adapted to perform some or all of the applicable functions in hardware. Alternatively, the functions may be performed by one or more other processing units (or cores), on one or more integrated circuits. In some other examples, other types of integrated circuits may be used (e.g., Structured/Platform ASICs, FPGAs, a SoC, and/or other types of Semi-Custom ICs), which may be programmed in any manner known in the art. The functions of each component may, additionally or alternatively, be implemented, in whole or in part, with instructions embodied in a memory, formatted to be executed by one or more general or application-specific processors.

In some examples, the wireless communication manager 1420 may be used to manage one or more aspects of wireless communication for a UE or apparatus, such as one of the UEs 115 described with reference to FIG. 1, or one of the apparatus 1315 described with reference to FIG. 13. In some examples, part of the wireless communication manager 1420 may be incorporated into or shared with a receiver or a transmitter (e.g., the receiver 1310 or the transmitter 1330 described with reference to FIG. 13). In some examples, the wireless communication manager 1420 may include an UpPTS scheduling manager 1445, an UpPTS timing and condition manager 1450, an UpPTS structure identifier 1435, a transmit power scaler 1455, an UpPTS communication manager 1440, or a re-transmission scheduling manager 1460.

The UpPTS scheduling manager 1445 may be used to receive timing or scheduling information for an UpPTS. The UpPTS may occur during a portion of a subframe (e.g., during a portion of a S subframe described with reference to FIG. 2). In some examples, at least some of the timing or scheduling information may be received in an earlier-transmitted subframe (i.e., a subframe received prior to the subframe including the UpPTS). In some examples, a scheduling of a PUSCH scheduled for transmission in the UpPTS may be received in the earlier-transmitted subframe. In some examples, the timing or scheduling information for the UpPTS may be received from a network access device (e.g., a base station).

In some examples, receiving the scheduling of the PUSCH in the earlier-transmitted subframe, using the UpPTS scheduling manager 1445, may include receiving, in the earlier-transmitted subframe, an uplink grant for the PUSCH. In some examples, the uplink grant for the PUSCH scheduled for transmission in the UpPTS may be an only uplink grant received in the earlier-transmitted subframe. In some examples, the UpPTS scheduling manager 1445 may be used to receive, in the earlier-transmitted subframe, at least one additional uplink grant for at least one additional PUSCH scheduled in at least one additional subframe (e.g., at least one additional subframe other than the subframe in which the PUSCH occurs). In some examples, the UpPTS scheduling manager 1445 may identify: a separate PHICH resource or a shared PHICH resource for the PUSCH scheduled for transmission in the UpPTS. The shared PHICH resource may be shared with the at least one additional PUSCH scheduled in at least one additional subframe (e.g., at least one additional subframe other than the subframe in which the PUSCH occurs). In some examples, the uplink grant for the PUSCH scheduled for transmission in the UpPTS may, additionally or alternatively, schedule at least one additional PUSCH scheduled in at least one additional subframe (e.g., in at least one additional subframe other than the subframe in which the PUSCH occurs). In some examples, the uplink grant for the PUSCH scheduled for transmission in the UpPTS may be received in a PDCCH. In some examples, the UpPTS scheduling manager 1445 may be used to receive a configuration of a separate HARQ process for the PUSCH scheduled for transmission in the UpPTS. In some examples, the UpPTS scheduling manager 1445 may be used to receive an allocation of resources of the PUSCH scheduled for transmission in the UpPTS based on a multiple resource block granularity.

The UpPTS scheduling manager 1445 may, additionally or alternatively, be used to identify a same DCI size scheduling for the PUSCH scheduled for transmission in the UpPTS and at least one additional PUSCH scheduled for an uplink subframe (e.g., a U subframe described with reference to FIG. 2).

The UpPTS timing and condition manager 1450 may be used to identify various timings and/or conditions of the UpPTS. In some examples, the UpPTS timing and condition manager 1450 may be used to identify a timing of a SRS transmitted during the UpPTS. In some examples, the UpPTS timing and condition manager 1450 may be used to identify a timing of a PUCCH transmitted during the UpPTS, and identifying at least one of: CSI, a SR, or a combination thereof transmitted in the PUCCH. In some examples, the UpPTS timing and condition manager 1450 may determine to refrain from transmitting HARQ information during the PUCCH. In some examples, the UpPTS timing and condition manager 1450 may be used to identify a timing of PRACH resources in more than two symbol periods of the UpPTS. In some examples, the UpPTS timing and condition manager 1450 may be used to identify a bundling of at least a first resource of the PUSCH scheduled for transmission in the UpPTS with at least a second resource of at least one additional PUSCH scheduled for at least one additional subframe. In some examples, the first resource may have a first resource granularity that differs from a second resource granularity of the second resource. In some examples, the UpPTS may occur prior to an uplink subframe, and the UpPTS timing and condition manager 1450 may be used to identify a restriction on a transmission, during the UpPTS, of at least one of: aperiodic CQI, or an aperiodic SRS, or a combination thereof. The restriction may be based on a transmission during the uplink subframe.

The UpPTS structure identifier 1435 may be used to receive an indication of a data structure and a demodulation reference signal structure of the PUSCH scheduled for transmission in the UpPTS from a network access device (e.g., from a base station). In some examples, the indication of the data structure and the demodulation reference signal structure of the PUSCH may include at least one of: a RRC configuration, or a dynamic indication in DCI, or a DCI format, or a combination thereof. The UpPTS structure identifier 1435 may, additionally or alternatively, be used to identify, at an apparatus including the wireless communication manager 1420 (e.g., a UE), a data structure associated with an UpPTS and a demodulation reference signal structure associated with the UpPTS.

In some examples, identifying the data structure and the demodulation reference signal structure associated with the UpPTS, using the UpPTS structure identifier 1435, may include identifying a data structure and a demodulation reference signal structure of the PUSCH scheduled for transmission in the UpPTS. In some examples, identifying the data structure and the demodulation reference signal structure of the PUSCH may include mapping a subset of modulation symbols of a nominal PUSCH configuration for a slot of the subframe to the UpPTS. In some examples, the subset of modulation symbols may include one of: a temporally last subset of modulation symbols of the nominal PUSCH configuration for the slot, or a temporally first subset of modulation symbols of the nominal PUSCH configuration for the slot. In some examples, identifying the data structure and the demodulation reference signal structure associated with the six symbol period UpPTS may include identifying that the UpPTS includes a six symbol period UpPTS and identifying a demodulation reference signal transmission mapped to one of: a temporally third symbol period of the six symbol period UpPTS, or a temporally fourth symbol period of the six symbol period UpPTS, or a temporally second symbol period and a temporally fifth symbol period of the six symbol period UpPTS, or two symbol periods of the six symbol period UpPTS, or at least a temporally first symbol period of the six symbol period UpPTS. In some examples, the data structure and the demodulation reference signal structure of the PUSCH scheduled for transmission in the UpPTS may be identified based on the indication of the data structure and the demodulation reference signal structure of the PUSCH (received by the UpPTS structure identifier 1435).

In some examples, the UpPTS may occur prior to an uplink subframe. In these examples, identifying the data structure and the demodulation reference signal structure of the PUSCH, using the UpPTS structure identifier 1435, may include identifying a PUSCH transport block configured for a TTI having a first duration equal to or less than a second duration of a single uplink subframe. Alternatively, identifying the data structure and the demodulation reference signal structure of the PUSCH, using the UpPTS structure identifier 1435, may include identifying a PUSCH transport block configured for a TTI spanning at least a portion of the UpPTS and at least a portion of the uplink subframe following the UpPTS.

The transmit power scaler 1455 may be used to scale a transmit power of the subframe including the UpPTS. The transmit power may be scaled at a subframe-level or at a slot-level.

The UpPTS communication manager 1440 may be used to communicate with a second apparatus (e.g., an apparatus associated with a network access device, such as a base station) based on the data structure and the demodulation reference signal structure identified by the UpPTS structure identifier 1435.

The re-transmission scheduling manager 1460 may be used to receive a scheduling of a re-transmission of the PUSCH transmitted in the UpPTS in at least one of: a PDCCH, or an EPDCCH, or an asynchronous uplink HARQ operation.

Figure 15:
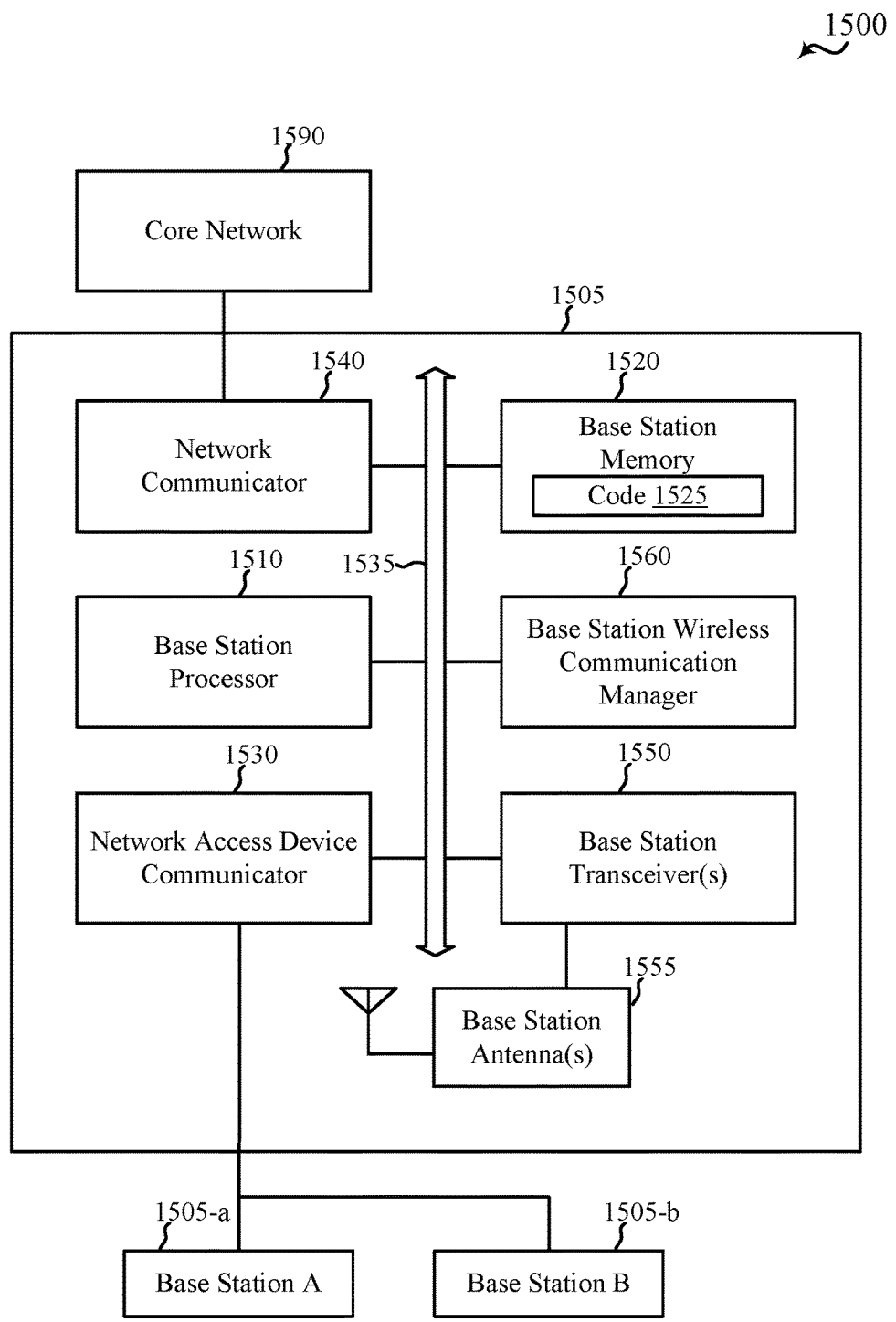
FIG. 15 shows a block diagram of a base station (e.g., a base station forming part or all of an eNB) for use in wireless communication, in accordance with various aspects of the present disclosure.

FIG. 15 shows a block diagram 1500 of a base station 1505 (e.g., a base station forming part or all of an eNB) for use in wireless communication, in accordance with various aspects of the present disclosure. In some examples, the base station 1505 may be an example of aspects of one or more of the base stations 105 described with reference to FIG. 1, or aspects of the apparatus 1105 described with reference to FIG. 1. The base station 1505 may be configured to implement or facilitate at least some of the network access device or base station features and functions described with reference to FIG. 1, 2, 3, 4, 5, 6, 7, 8, 9, 10, 11, or 12.

The base station 1505 may include a base station processor 1510, a base station memory 1520, at least one base station transceiver (represented by base station transceiver(s) 1550), at least one base station antenna (represented by base station antenna(s) 1555), or a base station wireless communication manager 1560. The base station 1505 may also include one or more of a network access device communicator 1530 or a network communicator 1540. Each of these components may be in communication with each other, directly or indirectly, over one or more base station buses 1535.

The base station memory 1520 may include random access memory (RAM) or read-only memory (ROM). The base station memory 1520 may store computer-readable, computer-executable code 1525 containing instructions that are configured to, when executed, cause the base station processor 1510 to perform various functions described herein related to wireless communication, including, for example, identifying a data structure associated with an UpPTS and a demodulation reference signal structure associated with the UpPTS, and communicating with another apparatus based on the data structure and the demodulation reference signal structure. Alternatively, the computer-executable code 1525 may not be directly executable by the base station processor 1510 but be configured to cause the base station 1505 (e.g., when compiled and executed) to perform various of the functions described herein.

The base station processor 1510 may include an intelligent hardware device, e.g., a central processing unit (CPU), a microcontroller, an ASIC, etc. The base station processor 1510 may process information received through the base station transceiver(s) 1550, the network access device communicator 1530, or the network communicator 1540. The base station processor 1510 may, additionally or alternatively, process information to be sent to the base station transceiver(s) 1550 for transmission through the base station antenna(s) 1555, to the network access device communicator 1530, for transmission to one or more other network access devices (e.g., the base station 1505-*a* or the base station 1505-*b*), or to the network communicator 1540 for transmission to a core network 1590, which may be an example of one or more aspects of the core network 130 described with reference to FIG. 1. The base station processor 1510 may handle, alone or in connection with the base station wireless communication manager 1560, various aspects of communicating over (or managing communications over) one or more radio frequency spectrum bands.

The base station transceiver(s) 1550 may include a modem configured to modulate packets and provide the modulated packets to the base station antenna(s) 1555 for transmission, and to demodulate packets received from the base station antenna(s) 1555. The base station transceiver(s) 1550 may, in some examples, be implemented as one or more transmitters and one or more separate receivers. The base station transceiver(s) 1550 may support communication over one or more wireless communication links. The base station transceiver(s) 1550 may be configured to communicate bi-directionally, via the base station antenna(s) 1555, with one or more UEs or other apparatuses, such as one or more of the UEs 115 described with reference to FIG. 1, or the apparatus 1315, described with reference to FIG. 13. The base station 1505 may, for example, include multiple base station antennas (e.g., an antenna array). The base station 1505 may communicate with the core network 1590 through the network communicator 1540. The base station 1505 may, additionally or alternatively, communicate with other network access devices, such as the base station 1505-*a* or the base station 1505-*b*, using the network access device communicator 1530.

The base station wireless communication manager 1560 may be configured to perform or control some or all of the network access device or base station features or functions described with reference to FIG. 1, 2, 3, 4, 5, 6, 7, 8, 9, 10, 11, or 12. The base station wireless communication manager 1560, or portions of it, may include a processor, or some or all of the functions of the base station wireless communication manager 1560 may be performed by the base station processor 1510 or in connection with the base station processor 1510. In some examples, the base station wireless communication manager 1560 may be an example of the wireless communication manager 1120 or 1220 described with reference to FIG. 11 or 12.

Figure 16:
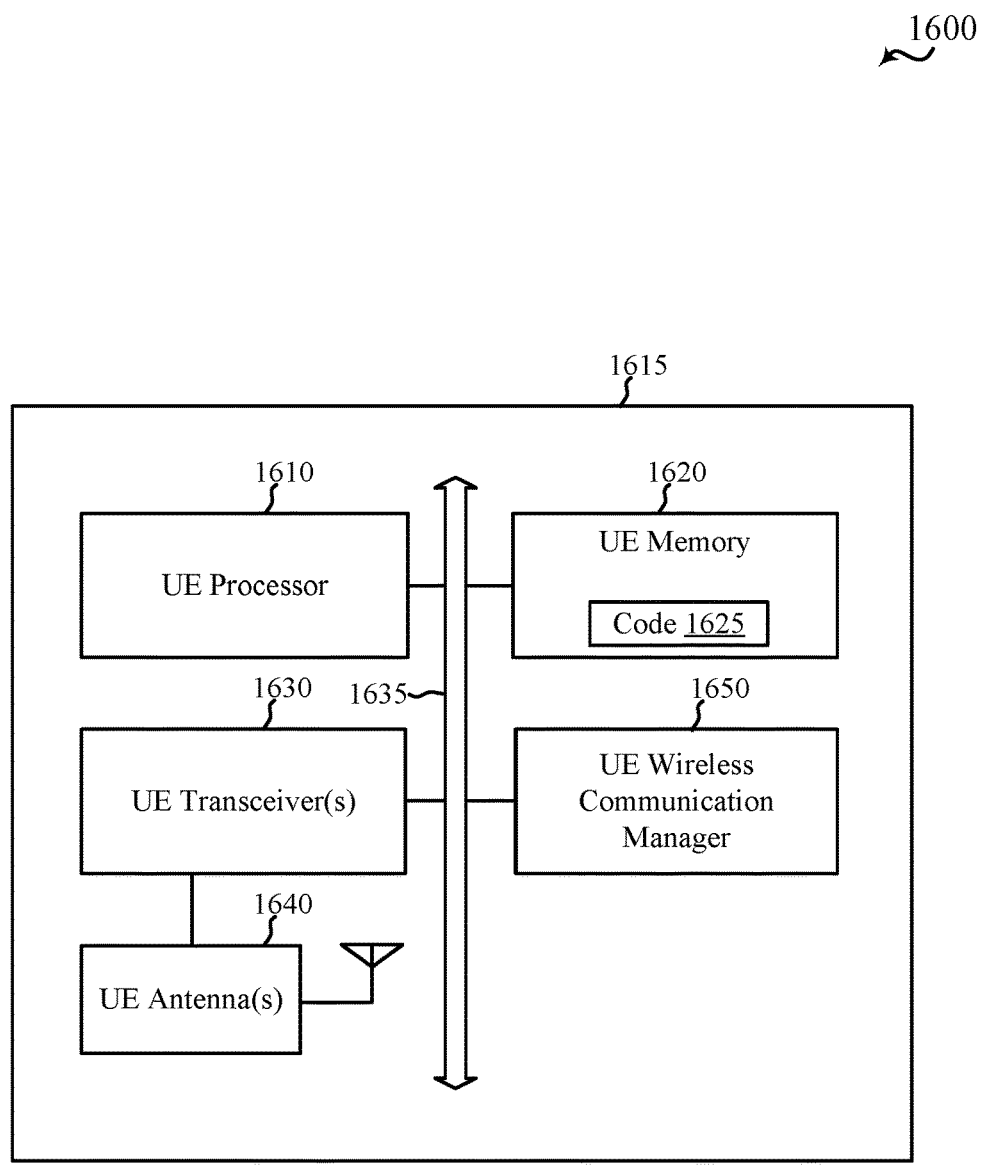
FIG. 16 shows a block diagram of a UE for use in wireless communication, in accordance with various aspects of the present disclosure.

FIG. 16 shows a block diagram 1600 of a UE 1615 for use in wireless communication, in accordance with various aspects of the present disclosure. The UE 1615 may be included or be part of a personal computer (e.g., a laptop computer, a netbook computer, a tablet computer, etc.), a cellular telephone, a PDA, a DVR, an internet appliance, a gaming console, an e-reader, etc. The UE 1615 may, in some examples, have an internal power supply (not shown), such as a small battery, to facilitate mobile operation. In some examples, the UE 1615 may be an example of aspects of one or more of the UEs 115 described with reference to FIG. 1, or aspects of the apparatus 1315 described with reference to FIG. 13. The UE 1615 may be configured to implement at least some of the UE features and functions described with reference to FIG. 1, 2, 3, 4, 5, 6, 7, 8, 9, 10, 13, or 14.

The UE 1615 may include a UE processor 1610, a UE memory 1620, at least one UE transceiver (represented by UE transceiver(s) 1630), at least one UE antenna (represented by UE antenna(s) 1640), or a UE wireless communication manager 1650. Each of these components may be in communication with each other, directly or indirectly, over one or more UE buses 1635.

The UE memory 1620 may include RAM or ROM. The UE memory 1620 may store computer-readable, computer-executable code 1625 containing instructions that are configured to, when executed, cause the UE processor 1610 to perform various functions described herein related to wireless communication, including, for example, identifying a data structure associated with an UpPTS and a demodulation reference signal structure associated with the UpPTS, and communicating with another apparatus based on the data structure and the demodulation reference signal structure. Alternatively, the computer-executable code 1625 may not be directly executable by the UE processor 1610 but be configured to cause the UE 1615 (e.g., when compiled and executed) to perform various of the functions described herein.

The UE processor 1610 may include an intelligent hardware device, e.g., a CPU, a microcontroller, an ASIC, etc. The UE processor 1610 may process information received through the UE transceiver(s) 1630 or information to be sent to the UE transceiver(s) 1630 for transmission through the UE antenna(s) 1640. The UE processor 1610 may handle, alone or in connection with the UE wireless communication manager 1650, various aspects of communicating over (or managing communications over) one or more radio frequency spectrum bands.

The UE transceiver(s) 1630 may include a modem configured to modulate packets and provide the modulated packets to the UE antenna(s) 1640 for transmission, and to demodulate packets received from the antenna(s) 1640. The UE transceiver(s) 1630 may, in some examples, be implemented as one or more transmitters and one or more separate receivers. The UE transceiver(s) 1630 may support communications over one or more wireless communication links. The UE transceiver(s) 1630 may be configured to communicate bi-directionally, via the UE antenna(s) 1640, with one or more network access devices or other apparatuses, such as one or more of the base stations 105 described with reference to FIG. 1 or 15, or the apparatus 1105 described with reference to FIG. 1. While the UE 1615 may include a single UE antenna, there may be examples in which the UE 1615 may include multiple UE antennas.

The UE wireless communication manager 1650 may be configured to perform or control some or all of the UE features or functions described with reference to FIG. 1, 2, 3, 4, 5, 6, 7, 8, 9, 10, 13, or 14. The UE wireless communication manager 1650, or portions of it, may include a processor, or some or all of the functions of the UE wireless communication manager 1650 may be performed by the UE processor 1610 or in connection with the UE processor 1610. In some examples, the UE wireless communication manager 1650 may be an example of the wireless communication manager 1320 or 1420 described with reference to FIG. 13 or 14.

Figure 17:
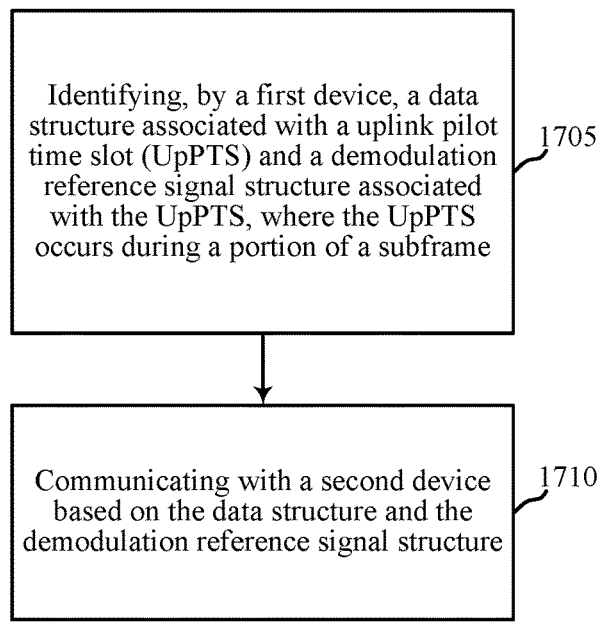
FIG. 17 is a flow chart illustrating an example of a method for wireless communication at a network access device (e.g., a base station), in accordance with various aspects of the present disclosure.

FIG. 17 is a flow chart illustrating an example of a method 1700 for wireless communication at a network access device (e.g., a base station), in accordance with various aspects of the present disclosure. For clarity, the method 1700 is described below with reference to a network access device including aspects of one or more of the base stations 105 or 1505 described with reference to FIG. 1 or 15, or aspects of the apparatus 1105 described with reference to FIG. 11. In some examples, a base station may execute one or more sets of codes to control the functional elements of the base station to perform the functions described below. Additionally or alternatively, the base station may perform one or more of the functions described below using special-purpose hardware.

At block 1705, the method 1700 may include identifying, by a first device (e.g., a network access device), a data structure associated with an UpPTS and a demodulation reference signal structure associated with the UpPTS. The UpPTS may occur during a portion of a subframe (e.g., during a portion of a S subframe). The operation(s) at block 1705 may be performed using the wireless communication manager 1120 or 1220 described with reference to FIG. 11 or 12, the base station wireless communication manager 1560 described with reference to FIG. 15, or the UpPTS structure identifier 1135 or 1235 described with reference to FIG. 11 or 12.

At block 1710, the method 1700 may include communicating with a second device (e.g., a UE) based on the data structure and the demodulation reference signal structure identified at block 1705. The operation(s) at block 1710 may be performed using the wireless communication manager 1120 or 1220 described with reference to FIG. 11 or 12, the base station wireless communication manager 1560 described with reference to FIG. 15, or the UpPTS communication manager 1140 or 1240 described with reference to FIG. 11 or 12.

Figure 18:
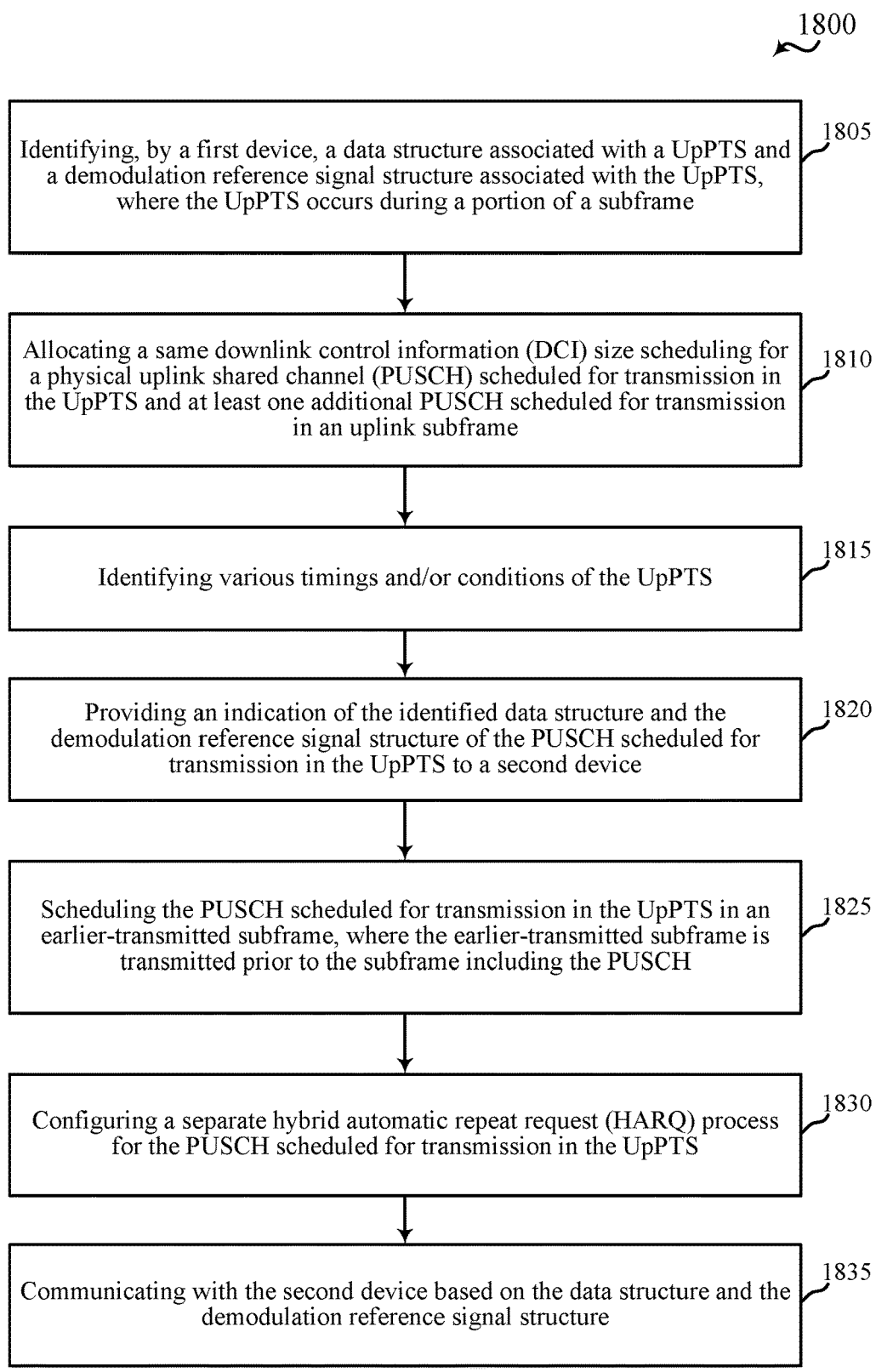
FIG. 18 is a flow chart illustrating an example of a method for wireless communication at a network access device (e.g., a base station), in accordance with various aspects of the present disclosure.

FIG. 18 is a flow chart illustrating an example of a method 1800 for wireless communication at a network access device (e.g., a base station), in accordance with various aspects of the present disclosure. For clarity, the method 1800 is described below with reference to a network access device including aspects of one or more of the base stations 105 or 1505 described with reference to FIG. 1 or 15, or aspects of the apparatus 1105 described with reference to FIG. 11. In some examples, a base station may execute one or more sets of codes to control the functional elements of the base station to perform the functions described below. Additionally or alternatively, the base station may perform one or more of the functions described below using special-purpose hardware.

At block 1805, the method 1800 may include identifying, by a first device (e.g., a network access device), a data structure associated with an UpPTS and a demodulation reference signal structure associated with the UpPTS. The UpPTS may occur during a portion of a subframe (e.g., during a portion of a S subframe described with reference to FIG. 2). The operation(s) at block 1805 may be performed using the wireless communication manager 1120 or 1220 described with reference to FIG. 11 or 12, the base station wireless communication manager 1560 described with reference to FIG. 15, or the UpPTS structure identifier 1135 or 1235 described with reference to FIG. 11 or 12.

In some examples, identifying the data structure and the demodulation reference signal structure associated with the UpPTS, at block 1805, may include identifying a data structure and a demodulation reference signal structure of a PUSCH scheduled for transmission in the UpPTS. In some examples, identifying the data structure and the demodulation reference signal structure of the PUSCH may include mapping a subset of modulation symbols of a nominal PUSCH configuration for a slot of the subframe to the UpPTS. In some examples, the subset of modulation symbols may include one of: a temporally last subset of modulation symbols of the nominal PUSCH configuration for the slot, or a temporally first subset of modulation symbols of the nominal PUSCH configuration for the slot. In some examples, identifying the data structure and the demodulation reference signal structure associated with the UpPTS may include identifying a demodulation reference signal transmission mapped to one of: a temporally third symbol period of the UpPTS, or a temporally fourth symbol period of the UpPTS, or a temporally second symbol period and a temporally fifth symbol period of the UpPTS, or two symbol periods of the UpPTS, or at least a temporally first symbol period of the UpPTS.

In some examples, the UpPTS may occur prior to an uplink subframe (e.g., a U subframe described with reference to FIG. 2). In these examples, identifying the data structure and the demodulation reference signal structure of the PUSCH, at block 1805, may include identifying a PUSCH transport block configured for a TTI having a first duration equal to or less than a second duration of a single uplink subframe. Alternatively, identifying the data structure and the demodulation reference signal structure of the PUSCH, at block 1805, may include identifying a PUSCH transport block configured for a TTI spanning at least a portion of the UpPTS and at least a portion of the uplink subframe following the UpPTS. In some examples, the operations at block 1805 may include allocating resources of the PUSCH based part on a multiple resource block granularity.

At block 1810, the method 1800 may include allocating a same DCI size scheduling for the PUSCH scheduled for transmission in the UpPTS and at least one additional PUSCH scheduled for transmission in an uplink subframe. The operation(s) at block 1810 may be performed using the wireless communication manager 1120 or 1220 described with reference to FIG. 11 or 12, the base station wireless communication manager 1560 described with reference to FIG. 15, or the UpPTS scheduler 1245 described with reference to FIG. 12.

At block 1815, the method 1800 may include identifying various timings and/or conditions of the UpPTS. In some examples, the operations at block 1815 may include identifying a timing of a SRS transmitted during the UpPTS. In some examples, the operations at block 1815 may include identifying a timing of a PUCCH transmitted during the UpPTS, and identifying at least one of: CS), a SR, or a combination thereof transmitted in the PUCCH. In some examples, the operations at block 1815 may include identifying a timing of PRACH resources in more than two symbol periods of the UpPTS. In some examples, the operations at block 1815 may include identifying a bundling of at least a first resource of the PUSCH scheduled for transmission in the UpPTS with at least a second resource of at least one additional PUSCH scheduled for at least one additional subframe (e.g., at least one subframe other than the subframe including the UpPTS). In some examples, the first resource may have a first resource granularity that differs from a second resource granularity of the second resource. In some examples, the UpPTS may occur prior to an uplink subframe, and the method may include identifying a restriction on a transmission, during the UpPTS, of at least one of: aperiodic CQI, or an aperiodic SRS, or a combination thereof. The restriction may be based on a transmission during the uplink subframe. In some examples, the operations at block 1815 may include scaling a transmit power of the subframe including the UpPTS. The transmit power may be scaled at a subframe-level or at a slot-level. The operation(s) at block 1815 may be performed using the wireless communication manager 1120 or 1220 described with reference to FIG. 11 or 12, the base station wireless communication manager 1560 described with reference to FIG. 15, or the UpPTS timing and condition manager 1250 described with reference to FIG. 12.

At block 1820, the method 1800 may include providing an indication of the identified data structure and the demodulation reference signal structure of the PUSCH scheduled for transmission in the UpPTS to a second device (e.g., a UE). The operation(s) at block 1820 may be performed using the wireless communication manager 1120 or 1220 described with reference to FIG. 11 or 12, the base station wireless communication manager 1560 described with reference to FIG. 15, or the UpPTS structure indicator 1255 described with reference to FIG. 12.

At block 1825, the method 1800 may include scheduling the PUSCH scheduled for transmission in the UpPTS in an earlier-transmitted subframe, where the earlier-transmitted subframe may be transmitted prior to the subframe including the PUSCH. The operation(s) at block 1825 may be performed using the wireless communication manager 1120 or 1220 described with reference to FIG. 11 or 12, the base station wireless communication manager 1560 described with reference to FIG. 15, or the UpPTS scheduler 1245 described with reference to FIG. 12.

In some examples, scheduling the PUSCH scheduled for transmission in the UpPTS in the earlier-transmitted subframe, at block 1825, may include transmitting, in the earlier-transmitted subframe, an uplink grant for the PUSCH scheduled for transmission in the UpPTS. In some examples, the uplink grant for the PUSCH scheduled for transmission in the UpPTS may be an only uplink grant transmitted in the earlier-transmitted subframe. In some examples, the method 1800 may include transmitting, in the earlier-transmitted subframe, at least one additional uplink grant for at least one additional PUSCH scheduled in at least one additional subframe (e.g., in at least one subframe other than the subframe including the UpPTS). In some examples, the operations at block 1825 may include allocating: a separate PHICH resource or a shared PHICH resource for the PUSCH transmitted in the UpPTS, where the shared PHICH resource may be shared with the at least one additional PUSCH. In some examples, the uplink grant for the PUSCH scheduled for transmission in the UpPTS may schedule at least one additional PUSCH scheduled in at least one additional subframe (e.g., at least one subframe other than the subframe including the UpPTS). In some examples, the uplink grant may be transmitted in a PDCCH.

At block 1830, the method 1800 may include configuring a separate HARQ process for the PUSCH scheduled for transmission in the UpPTS. The operation(s) at block 1830 may be performed using the wireless communication manager 1120 or 1220 described with reference to FIG. 11 or 12, the base station wireless communication manager 1560 described with reference to FIG. 15, or the uplink HARQ configurator 1260 described with reference to FIG. 12.

At block 1835, the method 1800 may include communicating with the second device (e.g., a UE) based on the data structure and the demodulation reference signal structure identified at block 1805. The operation(s) at block 1835 may be performed using the wireless communication manager 1120 or 1220 described with reference to FIG. 11 or 12, the base station wireless communication manager 1560 described with reference to FIG. 15, or the UpPTS communication manager 1140 or 1240 described with reference to FIG. 11 or 12.

In some examples, the method 1800 may include scheduling a re-transmission of the PUSCH transmitted in the UpPTS using at least one of: a PDCCH, or an EPDCCH, or an asynchronous uplink HARQ operation. The re-transmission may be scheduled using the wireless communication manager 1120 or 1220 described with reference to FIG. 11 or 12, the base station wireless communication manager 1560 described with reference to FIG. 15, or the re-transmission scheduler 1265 described with reference to FIG. 12.

Figure 19:
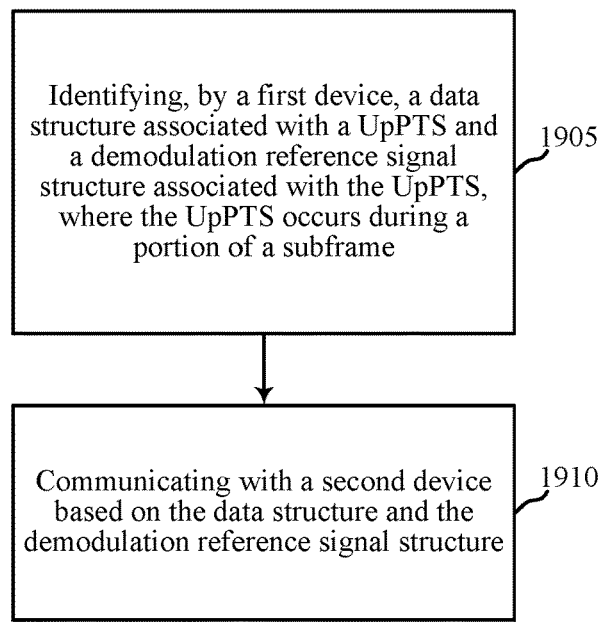
FIG. 19 is a flow chart illustrating an example of a method for wireless communication at a UE, in accordance with various aspects of the present disclosure.

FIG. 19 is a flow chart illustrating an example of a method 1900 for wireless communication at a UE, in accordance with various aspects of the present disclosure. For clarity, the method 1900 is described below with reference to a UE including aspects of one or more of the UEs 115 or 1615 described with reference to FIG. 1 or 16, or aspects of the apparatus 1315 described with reference to FIG. 13. In some examples, a UE may execute one or more sets of codes to control the functional elements of the UE to perform the functions described below. Additionally or alternatively, the UE may perform one or more of the functions described below using special-purpose hardware.

At block 1905, the method 1900 may include identifying, by a first device (e.g., a UE), a data structure associated with an UpPTS and a demodulation reference signal structure associated with the UpPTS. The UpPTS may occur during a portion of a subframe (e.g., during a portion of a S subframe). The operation(s) at block 1905 may be performed using the wireless communication manager 1320 or 1420 described with reference to FIG. 13 or 14, the UE wireless communication manager 1650 described with reference to FIG. 16, or the UpPTS structure identifier 1335 or 1435 described with reference to FIG. 13 or 14.

At block 1910, the method 1900 may include communicating with a second device (e.g., a network access device, such as a base station) based on the data structure and the demodulation reference signal structure identified at block 1905. The operation(s) at block 1910 may be performed using the wireless communication manager 1320 or 1420 described with reference to FIG. 13 or 14, the UE wireless communication manager 1650 described with reference to FIG. 16, or the UpPTS communication manager 1340 or 1440 described with reference to FIG. 13 or 14.

Figure 20:
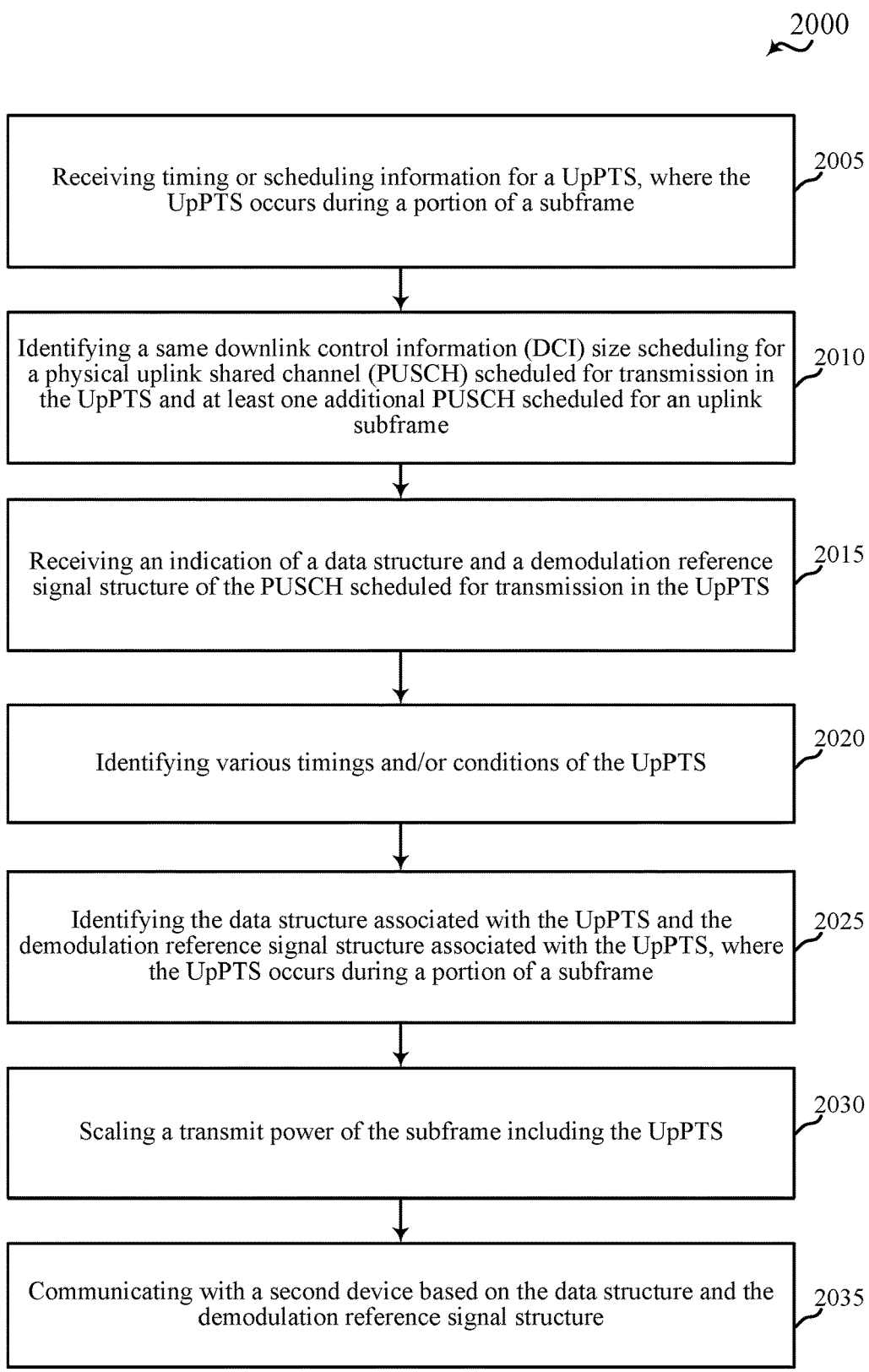
FIG. 20 is a flow chart illustrating an example of a method for wireless communication at a UE, in accordance with various aspects of the present disclosure.

FIG. 20 is a flow chart illustrating an example of a method 2000 for wireless communication at a UE, in accordance with various aspects of the present disclosure. For clarity, the method 2000 is described below with reference to a UE including aspects of one or more of the UEs 115 or 1615 described with reference to FIG. 1 or 16, or aspects of the apparatus 1315 described with reference to FIG. 13. In some examples, a UE may execute one or more sets of codes to control the functional elements of the UE to perform the functions described below. Additionally or alternatively, the UE may perform one or more of the functions described below using special-purpose hardware.

At block 2005, the method 2000 may include receiving timing or scheduling information for an UpPTS. The UpPTS may occur during a portion of a subframe (e.g., during a portion of a S subframe described with reference to FIG. 2). In some examples, at least some of the timing or scheduling information may be received in an earlier-transmitted subframe (i.e., a subframe received prior to the subframe including the UpPTS). In some examples, a scheduling of a PUSCH scheduled for transmission in the UpPTS may be received in the earlier-transmitted subframe. In some examples, the timing or scheduling information for the UpPTS may be received from a network access device (e.g., a base station). The operation(s) at block 2005 may be performed using the wireless communication manager 1320 or 1420 described with reference to FIG. 13 or 14, the UE wireless communication manager 1650 described with reference to FIG. 16, or the UpPTS scheduling manager 1445 described with reference to FIG. 14.

In some examples, receiving the scheduling of the PUSCH in the earlier-transmitted subframe, at block 2005, may include receiving, in the earlier-transmitted subframe, an uplink grant for the PUSCH. In some examples, the uplink grant for the PUSCH scheduled for transmission in the UpPTS may be an only uplink grant received in the earlier-transmitted subframe. In some examples, the operations at block 2005 may include receiving, in the earlier-transmitted subframe, at least one additional uplink grant for at least one additional PUSCH scheduled in at least one additional subframe (e.g., at least one additional subframe other than the subframe in which the PUSCH occurs). In some examples, the operations at block 2005 may include identifying: a separate PHICH resource or a shared PHICH resource for the PUSCH scheduled for transmission in the UpPTS. The shared PHICH resource may be shared with the at least one additional PUSCH scheduled in at least one additional subframe (e.g., at least one additional subframe other than the subframe in which the PUSCH occurs). In some examples, the uplink grant for the PUSCH scheduled for transmission in the UpPTS may, additionally or alternatively, schedule at least one additional PUSCH scheduled in at least one additional subframe (e.g., in at least one additional subframe other than the subframe in which the PUSCH occurs). In some examples, the uplink grant for the PUSCH scheduled for transmission in the UpPTS may be received in a PDCCH. In some examples, the operations at block 2005 may include receiving a configuration of a separate HARQ process for the PUSCH scheduled for transmission in the UpPTS. In some examples, the operations at block 2005 may include receiving an allocation of resources of the PUSCH scheduled for transmission in the UpPTS based on a multiple resource block granularity.

At block 2010, the method 2000 may include identifying a same DCI size scheduling for the PUSCH scheduled for transmission in the UpPTS and at least one additional PUSCH scheduled for an uplink subframe (e.g., a U subframe described with reference to FIG. 2). The operation(s) at block 2010 may be performed using the wireless communication manager 1320 or 1420 described with reference to FIG. 13 or 14, the UE wireless communication manager 1650 described with reference to FIG. 16, or the UpPTS scheduling manager 1445 described with reference to FIG. 14.

At block 2015, the method 2000 may include receiving an indication of the data structure and the demodulation reference signal structure of the PUSCH scheduled for transmission in the UpPTS from a network access device (e.g., from a base station). In some examples, the indication of the data structure and the demodulation reference signal structure of the PUSCH may include at least one of: a RRC configuration, or a dynamic indication in DCI, or a DCI format, or a combination thereof. The operation(s) at block 2015 may be performed using the wireless communication manager 1320 or 1420 described with reference to FIG. 13 or 14, the UE wireless communication manager 1650 described with reference to FIG. 16, or the UpPTS structure identifier 1335 or 1435 described with reference to FIG. 13 or 14.

At block 2020, the method 2000 may include identifying various timings and/or conditions of the UpPTS. The operation(s) at block 2020 may be performed using the wireless communication manager 1320 or 1420 described with reference to FIG. 13 or 14, the UE wireless communication manager 1650 described with reference to FIG. 16, or the UpPTS timing and condition manager 1450 described with reference to FIG. 14.

In some examples, the operations at block 2020 may include identifying a timing of a SRS transmitted during the UpPTS. In some examples, the operations at block 2020 may include identifying a timing of a PUCCH transmitted during the UpPTS, and identifying at least one of: CSI, a SR, or a combination thereof transmitted in the PUCCH. In some examples, the operations at block 2020 may include determining to refrain from transmitting HARQ information during the PUCCH. In some examples, the operations at block 2020 may include identifying a timing of PRACH resources in more than two symbol periods of the UpPTS. In some examples, the operations at block 2020 may include identifying a bundling of at least a first resource of the PUSCH scheduled for transmission in the UpPTS with at least a second resource of at least one additional PUSCH scheduled for at least one additional subframe. In some examples, the first resource may have a first resource granularity that differs from a second resource granularity of the second resource. In some examples, the UpPTS may occur prior to an uplink subframe, and the operations at block 2002 may include identifying a restriction on a transmission, during the UpPTS, of at least one of: aperiodic CQI, or an aperiodic SRS, or a combination thereof. The restriction may be based on a transmission during the uplink subframe.

At block 2025, the method 2000 may include identifying, by a first device (e.g., a UE), the data structure associated with the UpPTS and the demodulation reference signal structure associated with the UpPTS. The operation(s) at block 2025 may be performed using the wireless communication manager 1320 or 1420 described with reference to FIG. 13 or 14, the UE wireless communication manager 1650 described with reference to FIG. 16, or the UpPTS structure identifier 1335 or 1435 described with reference to FIG. 13 or 14.

In some examples, identifying the data structure and the demodulation reference signal structure associated with the UpPTS, at block 2025, may include identifying a data structure and a demodulation reference signal structure of the PUSCH scheduled for transmission in the UpPTS. In some examples, identifying the data structure and the demodulation reference signal structure of the PUSCH may include mapping a subset of modulation symbols of a nominal PUSCH configuration for a slot of the subframe to the UpPTS. In some examples, the subset of modulation symbols may include one of: a temporally last subset of modulation symbols of the nominal PUSCH configuration for the slot, or a temporally first subset of modulation symbols of the nominal PUSCH configuration for the slot. In some examples, identifying the data structure and the demodulation reference signal structure associated with the UpPTS may include identifying that the UpPTS may include a six symbol period UpPTS, identifying a demodulation reference signal transmission mapped to one of: a temporally third symbol period of the six symbol period UpPTS, or a temporally fourth symbol period of the six symbol period UpPTS, or a temporally second symbol period and a temporally fifth symbol period of the six symbol period UpPTS, or two symbol periods of the six symbol period UpPTS, or at least a temporally first symbol period of the six symbol period UpPTS. In some examples, the data structure and the demodulation reference signal structure of the PUSCH scheduled for transmission in the UpPTS may be identified based on the indication of the data structure and the demodulation reference signal structure of the PUSCH (received at block 2015).

In some examples, the UpPTS may occur prior to an uplink subframe. In these examples, identifying the data structure and the demodulation reference signal structure of the PUSCH, at block 2025, may include identifying a PUSCH transport block configured for a TTI having a first duration equal to or less than a second duration of a single uplink subframe. Alternatively, identifying the data structure and the demodulation reference signal structure of the PUSCH, at block 2025, may include identifying a PUSCH transport block configured for a TTI spanning at least a portion of the UpPTS and at least a portion of the uplink subframe following the UpPTS.

At block 2030, the method 2000 may include scaling a transmit power of the subframe including the UpPTS. The transmit power may be scaled at a subframe-level or at a slot-level. The operation(s) at block 2030 may be performed using the wireless communication manager 1320 or 1420 described with reference to FIG. 13 or 14, the UE wireless communication manager 1650 described with reference to FIG. 16, or the transmit power scaler 1455 described with reference to FIG. 14.

At block 2035, the method 2000 may include communicating with a second device (e.g., a network access device, such as a base station) based on the data structure and the demodulation reference signal structure identified at block 2025. The operation(s) at block 2035 may be performed using the wireless communication manager 1320 or 1420 described with reference to FIG. 13 or 14, the UE wireless communication manager 1650 described with reference to FIG. 16, or the UpPTS communication manager 1340 or 1440 described with reference to FIG. 13 or 14.

In some examples, the method 2000 may include receiving a scheduling of a re-transmission of the PUSCH transmitted in the UpPTS in at least one of: a PDCCH, or an EPDCCH, or an asynchronous uplink HARQ operation. The scheduling of the re-transmission may be received using the wireless communication manager 1320 or 1420 described with reference to FIG. 13 or 14, the UE wireless communication manager 1650 described with reference to FIG. 16, or the re-transmission scheduling manager 1460 described with reference to FIG. 14.

The methods 1700, 1800, 1900, and 2000 described with reference to FIGS. 17, 18, 19, and 20 describe possible implementations, and the operations of the methods may be rearranged or otherwise modified such that other implementations are possible.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A may be referred to as CDMA2000 1x, 1x, etc. IS-856 (TIA-856) may be referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-A are new releases of UMTS that use E-UTRA. UTRA, E-UTRA, UMTS, LTE, LTE-A, and GSM are described in documents from an organization named 3GPP. CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent all of the examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may, additionally or alternatively, be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Components implementing functions may, additionally or alternatively, be physically located at various positions, including being distributed such that portions of functions are implemented at different physical locations. As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel techniques disclosed herein.

What is claimed is:

1. A method for wireless communication, comprising:
    identifying, by a first device, a data structure associated with an uplink pilot time slot (UpPTS) for uplink data transmissions and a demodulation reference signal structure associated with the UpPTS, wherein the UpPTS occurs during a portion of a subframe;
    receiving, in an earlier subframe, a first uplink grant for the uplink data transmissions associated with the UpPTS and at least a second uplink grant for at least one additional uplink data transmission scheduled for at least one additional subframe, wherein the earlier subframe comprising the first uplink grant and the at least the second uplink grant is determined based at least in part on the data structure associated with the UpPTS;
    determining a size of a transport block configured for transmission within the UpPTS based at least in part on scaling a number of resource blocks associated with the data structure and the demodulation reference signal structure; and
    communicating with a second device based at least in part on the determined size of the transport block.

2. The method of claim 1, wherein identifying the data structure and the demodulation reference signal structure associated with the UpPTS comprises:
    identifying a data structure and a demodulation reference signal structure of a physical uplink shared channel (PUSCH) scheduled for transmission in the UpPTS.

3. The method of claim 2, wherein identifying the data structure and the demodulation reference signal structure of the PUSCH comprises:
    mapping a subset of modulation symbols of a nominal PUSCH configuration for a slot of the subframe to the UpPTS.

4. The method of claim 3, wherein the subset of modulation symbols comprises one of:
    a temporally last subset of modulation symbols of the nominal PUSCH configuration for the slot, or a temporally first subset of modulation symbols of the nominal PUSCH configuration for the slot.

5. The method of claim 2, wherein identifying the data structure and the demodulation reference signal structure associated with the UpPTS comprises:
    identifying that the UpPTS comprises a six symbol period UpPTS; and
    identifying a demodulation reference signal transmission mapped to one of: a temporally third symbol period of the six symbol period UpPTS, or a temporally fourth symbol period of the six symbol period UpPTS, or a temporally second symbol period and a temporally fifth symbol period of the six symbol period UpPTS, or two symbol periods of the six symbol period UpPTS, or at least a temporally first symbol period of the six symbol period UpPTS.

6. The method of claim 2, further comprising:
    receiving an indication of the data structure and the demodulation reference signal structure of the PUSCH from a network access device;
    wherein the data structure and the demodulation reference signal structure of the PUSCH scheduled for transmission in the UpPTS is identified based at least in part on the received indication of the data structure and the demodulation reference signal structure of the PUSCH.

7. The method of claim 6, wherein the indication of the data structure and the demodulation reference signal structure of the PUSCH comprises at least one of:
    a radio resource control (RRC) configuration, or a dynamic indication in downlink control information (DCI), or a DCI format, or a combination thereof.

8. The method of claim 2, wherein the UpPTS occurs prior to an uplink subframe.

9. The method of claim 8, wherein identifying the data structure and the demodulation reference signal structure of the PUSCH comprises:
    identifying a PUSCH transport block configured for a transmission time interval (TTI) having a first duration equal to or less than a second duration of a single uplink subframe.

10. The method of claim 8, wherein identifying the data structure and the demodulation reference signal structure of the PUSCH comprises:
    identifying a PUSCH transport block configured for a transmission time interval (TTI) spanning at least a portion of the UpPTS and at least a portion of the uplink subframe following the UpPTS.

11. The method of claim 2, further comprising:
receiving a scheduling of the PUSCH in the earlier-transmitted subframe, the earlier-transmitted subframe received prior to the subframe including the UpPTS.

12. The method of claim 11, wherein receiving the scheduling of the PUSCH in the earlier-transmitted subframe comprises:
receiving, in the earlier-transmitted subframe, the first uplink grant for the PUSCH.

13. The method of claim 12, further comprising:
receiving, in the earlier-transmitted subframe, at least one additional uplink grant for at least one additional PUSCH scheduled in at least one additional subframe.

14. The method of claim 13, further comprising:
identifying: a separate physical hybrid automatic repeat request indicator channel (PHICH) resource or a shared PHICH resource for the PUSCH, wherein the shared PHICH resource is shared with the at least one additional PUSCH.

15. The method of claim 12, wherein the first uplink grant for the PUSCH schedules at least one additional PUSCH scheduled in at least one additional subframe.

16. The method of claim 12, wherein the first uplink grant is received in a physical downlink control channel (PDCCH).

17. The method of claim 12, further comprising:
identifying a separate physical hybrid automatic repeat request indicator channel (PHICH) resource for the PUSCH.

18. The method of claim 2, further comprising:
receiving a configuration of a separate hybrid automatic repeat request (HARD) process for the PUSCH.

19. The method of claim 2, further comprising:
receiving a scheduling of a re-transmission of the PUSCH in at least one of: a physical downlink control channel (PDCCH), or an enhanced PDCCH (EPDCCH), or an asynchronous uplink hybrid automatic repeat request (HARQ) operation.

20. The method of claim 2, further comprising:
identifying a same downlink control information (DCI) size scheduling for the PUSCH scheduled for transmission in the UpPTS and at least one additional PUSCH scheduled for an uplink subframe.

21. The method of claim 2, further comprising:
receiving an allocation of resources of the PUSCH based at least in part on a multiple resource block granularity.

22. The method of claim 2, further comprising:
identifying a timing of a sounding reference signal (SRS) transmitted during the UpPTS.

23. The method of claim 2, further comprising:
identifying a timing of a physical uplink control channel (PUCCH) transmitted during the UpPTS; and
identifying at least one of: channel state information (CSI), a scheduling request (SR), or a combination thereof transmitted in the PUCCH.

24. The method of claim 23, further comprising:
determining to refrain from transmitting hybrid automatic repeat request (HARQ) information during the PUCCH.

25. The method of claim 2, further comprising:
identifying a timing of physical random access channel (PRACH) resources in more than two symbol periods of the UpPTS.

26. The method of claim 2, further comprising:
identifying a bundling of at least a first resource of the PUSCH scheduled for transmission in the UpPTS with at least a second resource of at least one additional PUSCH scheduled for at least one additional subframe.

27. The method of claim 26, wherein the first resource has a first resource granularity that differs from a second resource granularity of the second resource.

28. The method of claim 1, wherein the UpPTS occurs prior to an uplink subframe, the method further comprising:
identifying a restriction on a transmission, during the UpPTS, of at least one of: aperiodic channel quality information (CQI), or an aperiodic sounding reference signal (SRS), or a combination thereof, wherein the restriction is based at least in part on a transmission during the uplink subframe.

29. The method of claim 1, further comprising:
scaling a transmit power of the subframe: at a subframe-level, or at a slot-level.

30. An apparatus for wireless communication, comprising:
means for identifying, by a first device, a data structure associated with an uplink pilot time slot (UpPTS) and a demodulation reference signal structure associated with the UpPTS, wherein the UpPTS occurs during a portion of a subframe;
means for receiving, in an earlier subframe, a first uplink grant for the uplink data transmissions associated with the UpPTS and at least a second uplink grant for at least one additional uplink data transmission scheduled for at least one additional subframe, wherein the earlier subframe comprising the first uplink grant and the at least the second uplink grant is determined based at least in part on the data structure associated with the UpPTS;
means for determining a size of a transport block configured for transmission within the UpPTS based at least in part on scaling a number of resource blocks associated with the data structure and the demodulation reference signal structure; and
means for communicating with a second device based at least in part on the determined size of the transport block.

31. The apparatus of claim 30, wherein the means for identifying the data structure and the demodulation reference signal structure associated with the UpPTS comprises:
means for identifying a data structure and a demodulation reference signal structure of a physical uplink shared channel (PUSCH) scheduled for transmission in the UpPTS.

32. The apparatus of claim 31, wherein the means for identifying the data structure and the demodulation reference signal structure of the PUSCH comprises:
means for mapping a subset of modulation symbols of a nominal PUSCH configuration for a slot of the subframe to the UpPTS.

33. The apparatus of claim 32, wherein the subset of modulation symbols comprises one of:
a temporally last subset of modulation symbols of the nominal PUSCH configuration for the slot, or a temporally first subset of modulation symbols of the nominal PUSCH configuration for the slot.

34. The apparatus of claim 31, wherein the means for identifying the data structure and the demodulation reference signal structure associated with UpPTS comprises:
means for identifying that the UpPTS comprises a six symbol period UpPTS; and means for identifying a demodulation reference signal transmission mapped to one of: a temporally third symbol period of the six symbol period UpPTS, or a temporally fourth symbol period of the six symbol period UpPTS, or a temporally second symbol period and a temporally fifth symbol period of the six symbol period UpPTS, or two symbol periods of the six symbol period UpPTS, or at least a temporally first symbol period of the six symbol period UpPTS.

35. The apparatus of claim 31, further comprising:
means for receiving an indication of the data structure and the demodulation reference signal structure of the PUSCH from a network access device;
wherein the data structure and the demodulation reference signal structure of the PUSCH scheduled for transmission in the UpPTS is identified based at least in part on the received indication of the data structure and the demodulation reference signal structure of the PUSCH.

36. The apparatus of claim 35, wherein the indication of the data structure and the demodulation reference signal structure of the PUSCH comprises at least one of:
a radio resource control (RRC) configuration, or a dynamic indication in downlink control information (DCI), or a DCI format, or a combination thereof.

37. The apparatus of claim 31, wherein the UpPTS occurs prior to an uplink subframe.

38. The apparatus of claim 37, wherein the means for identifying the data structure and the demodulation reference signal structure of the PUSCH comprises:
means for identifying a PUSCH transport block configured for a transmission time interval (TTI) having a first duration equal to or less than a second duration of a single uplink subframe.

39. The apparatus of claim 37, wherein the means for identifying the data structure and the demodulation reference signal structure of the PUSCH comprises:
means for identifying a PUSCH transport block configured for a transmission time interval (TTI) spanning at least a portion of the UpPTS and at least a portion of the uplink subframe following the UpPTS.

40. The apparatus of claim 31, further comprising:
means for receiving a scheduling of the PUSCH in the earlier-transmitted subframe, the earlier-transmitted subframe received prior to the subframe including the UpPTS.

41. The apparatus of claim 40, wherein the means for receiving the scheduling of the PUSCH in the earlier-transmitted subframe comprises:
means for receiving, in the earlier-transmitted subframe, the first uplink grant for the PUSCH.

42. The apparatus of claim 41, further comprising:
means for receiving, in the earlier-transmitted subframe, at least one additional uplink grant for at least one additional PUSCH scheduled in at least one additional subframe.

43. The apparatus of claim 42, further comprising:
means for identifying: a separate physical hybrid automatic repeat request indicator channel (PHICH) resource or a shared PHICH resource for the PUSCH, wherein the shared PHICH resource is shared with the at least one additional PUSCH.

44. The apparatus of claim 41, wherein the first uplink grant for the PUSCH schedules at least one additional PUSCH scheduled in at least one additional subframe.

45. The apparatus of claim 41, wherein the first uplink grant is received in a physical downlink control channel (PDCCH).

46. The apparatus of claim 41, further comprising:
means for identifying a separate physical hybrid automatic repeat request indicator channel (PHICH) resource for the PUSCH.

47. The apparatus of claim 31, further comprising:
means for receiving a configuration of a separate hybrid automatic repeat request (HARD) process for the PUSCH.

48. The apparatus of claim 31, further comprising:
means for receiving a scheduling of a re-transmission of the PUSCH in at least one of: a physical downlink control channel (PDCCH), or an enhanced PDCCH (EPDCCH), or an asynchronous uplink hybrid automatic repeat request (HARQ) operation.

49. The apparatus of claim 31, further comprising:
means for identifying a same downlink control information (DCI) size scheduling for the PUSCH scheduled for transmission in the UpPTS and at least one additional PUSCH scheduled for an uplink subframe.

50. The apparatus of claim 31, further comprising:
means for receiving an allocation of resources of the PUSCH based at least in part on a multiple resource block granularity.

51. The apparatus of claim 31, further comprising:
means for identifying a timing of a sounding reference signal (SRS) transmitted during the UpPTS.

52. The apparatus of claim 31, further comprising:
means for identifying a timing of a physical uplink control channel (PUCCH) transmitted during the UpPTS; and
means for identifying at least one of: channel state information (CSI), a scheduling request (SR), or a combination thereof transmitted in the PUCCH.

53. The apparatus of claim 52, further comprising:
means for refraining from transmitting hybrid automatic repeat request (HARQ) information during the PUCCH.

54. The apparatus of claim 31, further comprising:
means for identifying a timing of physical random access channel (PRACH) resources in more than two symbol periods of the UpPTS.

55. The apparatus of claim 31, further comprising:
means for identifying a bundling of at least a first resource of the PUSCH scheduled for transmission in the UpPTS with at least a second resource of at least one additional PUSCH scheduled for at least one additional subframe.

56. The apparatus of claim 55, wherein the first resource has a first resource granularity that differs from a second resource granularity of the second resource.

57. The apparatus of claim 30, wherein the UpPTS occurs prior to an uplink subframe, the apparatus further comprising:
means for identifying a restriction on a transmission, during the UpPTS, of at least one of: aperiodic channel quality information (CQI), or an aperiodic sounding reference signal (SRS), or a combination thereof, wherein the restriction is based at least in part on a transmission during the uplink subframe.

58. The apparatus of claim 30, further comprising:
means for scaling a transmit power of the subframe: at a subframe-level, or at a slot-level.

59. An apparatus for wireless communication, comprising:
a processor;
memory in electronic communication with the processor; and instructions stored in the memory, the instructions being executable by the processor to:
identify, by a first device, a data structure associated with an uplink pilot time slot (UpPTS) and a demodulation reference signal structure associated with the UpPTS, wherein the UpPTS occurs during a portion of a subframe;
receive, in an earlier subframe, a first uplink grant for the uplink data transmissions associated with the UpPTS and at least a second uplink grant for at least one additional uplink data transmission scheduled for at least one additional subframe, wherein the earlier subframe comprising the first uplink grant and the at least the second uplink grant is determined based at least in part on the data structure associated with the UpPTS;
determine a size of a transport block configured for transmission within the UpPTS based at least in part on scaling a number of resource blocks associated with the data structure and the demodulation reference signal structure; and
communicate with a second device based at least in part on the determined size of the transport block.

60. A non-transitory computer-readable medium storing computer-executable code for wireless communication, the code executable by a processor to:
identify, by a first device, a data structure associated with an uplink pilot time slot (UpPTS) and a demodulation reference signal structure associated with the UpPTS, wherein the UpPTS occurs during a portion of a subframe;
receive, in an earlier subframe, a first uplink grant for the uplink data transmissions associated with the UpPTS and at least a second uplink grant for at least one additional uplink data transmission scheduled for at least one additional subframe, wherein the earlier subframe comprising the first uplink grant and the at least the second uplink grant is determined based at least in part on the data structure associated with the UpPTS;
determine a size of a transport block configured for transmission within the UpPTS based at least in part on scaling a number of resource blocks associated with the data structure and the demodulation reference signal structure; and
communicate with a second device based at least in part on the determined size of the transport block.

61. A method for wireless communication, comprising:
identifying, by a first device, a data structure associated with an uplink pilot time slot (UpPTS) for uplink data transmissions and a demodulation reference signal structure associated with the UpPTS, wherein the UpPTS occurs during a portion of a subframe;
scheduling uplink data transmissions in an earlier subframe based on the data structure associated with the UpPTS, wherein the scheduling comprises transmitting a first uplink grant for the uplink data transmissions associated with the UpPTS and at least a second uplink grant for at least one additional uplink data transmission in at least one additional subframe;
determining a size of a transport block configured for transmission within the UpPTS based at least in part on scaling a number of resource blocks associated with the data structure and the demodulation reference signal structure; and
communicating with a second device based at least in part on the determined size of the transport block.

62. The method of claim 61, wherein identifying the data structure and the demodulation reference signal structure associated with the UpPTS comprises:
identifying a data structure and a demodulation reference signal structure of a physical uplink shared channel (PUSCH) scheduled for transmission in the UpPTS.

63. The method of claim 62, further comprising:
providing an indication of the identified data structure and the demodulation reference signal structure of the PUSCH to a user equipment (UE).

64. The method of claim 62, further comprising:
scheduling the PUSCH in the earlier-transmitted subframe, the earlier-transmitted subframe transmitted prior to the subframe including the UpPTS.

65. The method of claim 64, wherein scheduling the PUSCH in the earlier-transmitted subframe comprises:
transmitting, in the earlier-transmitted subframe, the first uplink grant for the PUSCH.

66. The method of claim 65, further comprising:
transmitting, in the earlier-transmitted subframe, at least one additional uplink grant for at least one additional PUSCH scheduled in at least one additional subframe.

67. The method of claim 66, further comprising:
allocating: a separate physical hybrid automatic repeat request indicator channel (PHICH) resource or a shared PHICH resource for the PUSCH, wherein the shared PHICH resource is shared with the at least one additional PUSCH.

68. The method of claim 65, wherein the first uplink grant for the PUSCH schedules at least one additional PUSCH scheduled in at least one additional subframe.

69. The method of claim 65, wherein the first uplink grant is transmitted in a physical downlink control channel (PDCCH) or an enhanced PDCCH (EPDCCH).

70. The method of claim 65, further comprising:
allocating a separate physical hybrid automatic repeat request indicator channel (PHICH) resource for the PUSCH.

71. The method of claim 62, further comprising:
configuring a separate hybrid automatic repeat request (HARQ) process for the PUSCH.

72. The method of claim 62, further comprising:
scheduling a re-transmission of the PUSCH using at least one of: a physical downlink control channel (PDCCH), or an enhanced PDCCH (EPDCCH), or an asynchronous uplink hybrid automatic repeat request (HARQ) operation.

73. The method of claim 62, further comprising:
allocating a same downlink control information (DCI) size scheduling for the PUSCH scheduled for transmission in the UpPTS and at least one additional PUSCH scheduled for transmission in an uplink subframe.

74. The method of claim 62, further comprising:
allocating resources of the PUSCH based at least in part on a multiple resource block granularity.

75. An apparatus for wireless communication, comprising:
means for identifying, by a first device, a data structure associated with an uplink pilot time slot (UpPTS) and a demodulation reference signal structure associated with the UpPTS, wherein the UpPTS occurs during a portion of a subframe;
means for scheduling uplink data transmissions in an earlier subframe based on the data structure associated with the UpPTS, wherein the scheduling comprises transmitting a first uplink grant for the uplink data transmissions associated with the UpPTS and at least a second uplink grant for at least one additional uplink data transmission in at least one additional subframe;
means for determining a size of a transport block configured for transmission within the UpPTS based at least in part on scaling a number of resource blocks associated with the data structure and the demodulation reference signal structure; and
means for communicating with a second device based at least in part on the determined size of the transport block.

76. The apparatus of claim 75, wherein the means for identifying the data structure and the demodulation reference signal structure associated with the UpPTS comprises:
means for identifying a data structure and a demodulation reference signal structure of a physical uplink shared channel (PUSCH) scheduled for transmission in the UpPTS.

77. The apparatus of claim 76, further comprising:
means for providing an indication of the identified data structure and the demodulation reference signal structure of the PUSCH to a user equipment (UE).

78. The apparatus of claim 76, further comprising:
means for scheduling the PUSCH in an earlier-transmitted subframe, the earlier-transmitted subframe transmitted prior to the subframe including the UpPTS.

79. The apparatus of claim 78, wherein the means for scheduling the PUSCH in the earlier-transmitted subframe comprises:
means for transmitting, in the earlier-transmitted subframe, the first uplink grant for the PUSCH.

80. The apparatus of claim 79, further comprising:
means for transmitting, in the earlier-transmitted subframe, at least one additional uplink grant for at least one additional PUSCH scheduled in at least one additional subframe.

81. The apparatus of claim 80, further comprising:
means for allocating: a separate physical hybrid automatic repeat request indicator channel (PHICH) resource or a shared PHICH resource for the PUSCH, wherein the shared PHICH resource is shared with the at least one additional PUSCH.

82. The apparatus of claim 79, wherein the first uplink grant for the PUSCH schedules at least one additional PUSCH scheduled in at least one additional subframe.

83. The apparatus of claim 79, wherein the first uplink grant is transmitted in a physical downlink control channel (PDCCH) or an enhanced PDCCH (EPDCCH).

84. The apparatus of claim 79, further comprising:
means for allocating a separate physical hybrid automatic repeat request indicator channel (PHICH) resource for the PUSCH.

85. The apparatus of claim 76, further comprising:
means for configuring a separate hybrid automatic repeat request (HARQ) process for the PUSCH.

86. The apparatus of claim 76, further comprising:
means for scheduling a re-transmission of the PUSCH using at least one of: a physical downlink control channel (PDCCH), or an enhanced PDCCH (EPDCCH), or an asynchronous uplink hybrid automatic repeat request (HARQ) operation.

87. The apparatus of claim 76, further comprising:
means for allocating a same downlink control information (DCI) size scheduling for the PUSCH scheduled for transmission in the UpPTS and at least one additional PUSCH scheduled for transmission in an uplink subframe.

88. The apparatus of claim 76, further comprising:
means for allocating resources of the PUSCH based at least in part on a multiple resource block granularity.

89. An apparatus for wireless communication, comprising:
a processor;
memory in electronic communication with the processor; and
instructions stored in the memory, the instructions being executable by the processor to:
identify, by a first device, a data structure associated with an uplink pilot time slot (UpPTS) and a demodulation reference signal structure associated with the UpPTS, wherein the UpPTS occurs during a portion of a subframe;
schedule uplink data transmissions in an earlier subframe based on the data structure associated with the UpPTS, wherein the scheduling comprises transmitting a first uplink grant for the uplink data transmissions associated with the UpPTS and at least a second uplink grant for at least one additional uplink data transmission in at least one additional subframe;
determine a size of a transport block configured for transmission within the UpPTS based at least in part on scaling a number of resource blocks associated with the data structure and the demodulation reference signal structure; and
communicate with a second device based at least in part on the determined size of the transport block.

90. A non-transitory computer-readable medium storing computer-executable code for wireless communication, the code executable by a processor to:
identify, by a first device, a data structure associated with an uplink pilot time slot (UpPTS) and a demodulation reference signal structure associated with the UpPTS, wherein the UpPTS occurs during a portion of a subframe;
schedule uplink data transmissions in an earlier subframe based on the data structure associated with the UpPTS, wherein the scheduling comprises transmitting a first uplink grant for the uplink data transmissions associated with the UpPTS and at least a second uplink grant for at least one additional uplink data transmission in at least one additional subframe;
determine a size of a transport block configured for transmission within the UpPTS based at least in part on scaling a number of resource blocks associated with the data structure and the demodulation reference signal structure; and
communicate with a second device based at least in part on the determined size of the transport block.

* * * * *